(12) United States Patent
Wiedemann et al.

(10) Patent No.: US 8,379,014 B2
(45) Date of Patent: Feb. 19, 2013

(54) SYSTEM AND METHOD FOR 3D OBJECT RECOGNITION

(75) Inventors: Christian Wiedemann, Grafing (DE); Markus Ulrich, Grunwald (DE); Carsten Steger, Eching (DE)

(73) Assignee: MVTEC Software GmbH, Munich (DE)

(*) Notice: Subject to any disclaimer, the term of this patent is extended or adjusted under 35 U.S.C. 154(b) by 1382 days.

(21) Appl. No.: 12/034,362

(22) Filed: Feb. 20, 2008

(65) Prior Publication Data

US 2009/0096790 A1 Apr. 16, 2009

(30) Foreign Application Priority Data

Oct. 11, 2007 (EP) .................................. 07118329

(51) Int. Cl.
*G06T 15/00* (2011.01)
(52) U.S. Cl. .................... 345/419; 345/420; 345/428
(58) Field of Classification Search .................. None
See application file for complete search history.

(56) References Cited

U.S. PATENT DOCUMENTS

| | | | |
|---|---|---|---|
| 5,627,949 A * | 5/1997 | Letcher, Jr. .................. 345/420 |
| 5,666,441 A | 9/1997 | Rao et al. |
| 6,526,156 B1 | 2/2003 | Black et al. |
| 6,580,821 B1 | 6/2003 | Roy |
| 6,816,755 B2 | 11/2004 | Habibi et al. |
| 6,956,569 B1 | 10/2005 | Roy et al. |
| 7,239,929 B2 | 7/2007 | Ulrich et al. |
| 2001/0020946 A1 | 9/2001 | Kawakami et al. |
| 2002/0057838 A1 * | 5/2002 | Steger .......................... 382/197 |
| 2002/0181780 A1 | 12/2002 | Simon et al. |
| 2003/0123713 A1 | 7/2003 | Geng |
| 2004/0175041 A1 | 9/2004 | Miller |
| 2005/0286767 A1 | 12/2005 | Hager et al. |
| 2006/0132488 A1 * | 6/2006 | Lim et al. ...................... 345/428 |

FOREIGN PATENT DOCUMENTS

| | | |
|---|---|---|
| CA | 2535828 | 2/2005 |
| CA | 2555159 | 8/2005 |
| EP | 1193642 | 4/2002 |
| EP | 1693782 | 8/2006 |
| JP | 2002-245455 | 8/2002 |

(Continued)

OTHER PUBLICATIONS

Huang, Chang et al., "High-Performance rotation Invariant Multiview Face Detection", IEEE Transactions on Patter Analysis and Machine Intelligence, vol. 29, No. 4., Apr. 2007, pp. 671-686.

(Continued)

*Primary Examiner* — Said Broome
(74) *Attorney, Agent, or Firm* — Kagan Binder, PLLC

(57) ABSTRACT

The present invention provides a system and method for recognizing a 3D object in a single camera image and for determining the 3D pose of the object with respect to the camera coordinate system. In one typical application, the 3D pose is used to make a robot pick up the object. A view-based approach is presented that does not show the drawbacks of previous methods because it is robust to image noise, object occlusions, clutter, and contrast changes. Furthermore, the 3D pose is determined with a high accuracy. Finally, the presented method allows the recognition of the 3D object as well as the determination of its 3D pose in a very short computation time, making it also suitable for real-time applications. These improvements are achieved by the methods disclosed herein.

45 Claims, 17 Drawing Sheets

FOREIGN PATENT DOCUMENTS

JP              2006-301991         11/2006

OTHER PUBLICATIONS

Ekenel Hazim, et al., "Multiresolution face recognition", Image and Vision Computing, vol. 23, No. 5, May 1, 2005, pp. 469-477.
European Search Report mailed Jan. 1, 2008 for EP Application No. 07118329.7, 8 pages.
Bookstein, Fred L., "Principal Warps: Thin-Plate Splines and the Decompostion of Deformations", IEEE Transactions on pattern Analysis and Machine Intelligence, vol. 11, No. 6, Jun. 1989, pp. 567-585.
Jain, Anil K. et al., "Object Matching Using Deformable Templates", IEEE Transactions on Pattern Analysis and Machine Intelligence, vol. 18, No. 3, Mar. 1996, pp. 267-278.
Office Action issued in JP Application No. 2008-40298 dated Dec. 21, 2010, 4 pages.
Shi, Jianbo et al., "Normalized Cuts and Image Segmentation", Proc. of the IEEE Conf. on Comp. Vision and Pattern Recognition, San Juan, Puerto Rico, Jun. 1997.
D. H. Ballard: Generalizing the Hough transform to detect arbitrary shapes, Pattern Recognition, 13(2):111-122, 1981.
M. W. Bern and D. Eppstein: Mesh generation and optimal triangulation, Technical Report CSL-92-1, Xerox Palo Alto Research Center, 1992.
J. R. Beveridge and E. M. Risernan: Optimal Geometric Model Matching under Full 3D Perspectiive, Computer Vision and Image Understanding, 61(3): 351-364, 1995.
G. Borgefors: Hierarchical chamfer matching: A parametric edge matching algorithm. IEEE Transactions on Pattern Analysis and Machine Intelligence, 10(6): 849-865, 1988.
L. G. Brown: A survey of image registration techniques. ACM Computing Surveys, 24(4): 325-376, Dec. 1992.
P. David, D. DeMenthon, R. Duraiswami, H. Samet: Simultaneous Pose and Correspondence Determination using Line Features, Conference on Computer Vision and Pattern Recognition 2003, vol. 2: 424-431, 2003.
S. Di Zenzo: A note on the gradient of a multi-image. Computer Vision, Graphics, and Image Processing 33: 116-125, 1986.
D. M. Gavrila, F. C. A. Groen: 3D object recognition from 2D images using geometric hashing, Pattern Recoignition Letters 13: 263-278, 1992.
R. Horaud: New Methods for Matching 3-D Objects with Single perspective Views IEEE Transactions on Pattern Analysis and Machine Intelligence, 9(3): 401-412, 1987.
S. Lanser: Modellbasierte Lokalisation gestützt auf monokulare Videobilder, Dissertation thesis, Technische Universität München, Fakultät für Informatik, 1997. English translation of Table of Contents included.
S. Lamer, C. Zieri, and R. Beutlhauser: Multibildkalibrierung einer CCD-Kamera, in G. Sagere S. Posch and F. Kummert (editors), Musterkennung, Informatik aktuell, Springer-Verlag, Berlin: 481-491, 1995. English translation of abstract included.
V. Lepetit, J. Pilot, and P. Fua: Point Matching as a Classification Problem for Fast and Robust Object Pose Estimation, Conference on Computer Vision and Pattern Recognition, vol. 2: 244-250, 2004.

O. Munkelt: Erkennung von Objekten in Einzelvideobildern mitteis Aspektbäumen, Dissertation thesis, Technische Universität München, Institut für Informatik, München, 1996. English translation of abstract and Table of Contents included.
M. S. Paterson and F. F. Yao: Efficient binary space partitions for hidden-surface removal and solid modeling. Discrete & Computational Geometry, 5(1): 485-503, 1990.
W. J. Rucklidge: Efficiently locating objects using the Hausdorff distance. International Journal of Computer Vision, 24 (3): 251-270, 1997.
D. Rypl: Approaches to Discretization of 3D Surfaces, Habilitation thesis, CTU Reports, 7(2), CTU Publishing House, Prague, Czech Republic, ISBN 80-01-02755-4, 2003.
Y. Sumi and F. Tomita: Object Recognition Using Segment-Based Stereo Vision, Asian Conference on Computer Vision: 249-256, 1998.
S. L. Tanimoto: Template matching in pyramids, Computer Graphics and Image Processing 16: 356-369, 1981.
M. Ulrich, C. Steger, and A. Baumgartner: Real-time object recognition using a modified generalized Hough transform, Pattern Recognition, 36(11): 2557-2570, 2003.
M. Ulrich. Hierarchical Real-Time Recognition of Compound Objects in Images, Dissertation thesis, Technische Universität München, Fakultät Bauingenieur- und Vermessungswesen, Deutsche Geodätische Kommission bei der Bayerischen Akademie der Wissenschaften, Reihe C: Dissertationen, Heft Nr. 568, München, 2003.
Borotschnig et al., "Appearance-based active object recognition," Image and Vision Computing 18, pp. 715-727 (2000).
Byne et al., "A CAD-based computer vision system," Image and Vision Computing 16, pp. 533-539 (1998).
Cyr et al., "3D Object Recognition Using Shape Similarity-Based Aspect Graph," 8 pages, Jul. 2001.
Gavrila et al., "Real-Time Object Detection for 'Smart' Vehicles," 7 pages (1999).
Kollnig et al., "3D Pose Estimation by Directly Matching Polyhedral Models to Gray Value Gradients," International Journal of Computer Vision 23(3), pp. 283-302 (1997).
Lanser et al., "Robust Video-Based Object Recognition Using CAD Models," Technische Universitat Munchen, Institut fur Informatik, 8 pages.
Lowe, David G., "Three-Dimesional Object Recognition from Single Two-Dimensional Images," Artificial Intelligence, 31,3, pp. 1-39 (1987).
Nayar et al., "Real-Time 100 Object Recognition System," Proceedings of the 1996 IEEE International Conference on Robotics and Automation, Minneapolis, Minnesota, pp. 2321-2325 (Apr. 1996).
Roy et al., "Isolated 3-D Object Recognition through Next View Planning," IEEE Transactions on Systems, Man and Cybernatics—Part A: Systems and Humans, vol. 30, No. 1, pp. 67-76 (Jan. 2000).
Lowe et al., "Fitting Parameterized Three-Dimensional Models to Images," IEEE Transactions on Pattern Analysis and Machine Intelligence, vol. 13, No. 5, pp. 441-450 (May 1991).
von Bank et al., "A Visual Qualtiy Inspection System Based on a Hierarchical 3D Pose Estimation Algorithm, " DaimlerChrysler Research and Technology, pp. 1-8, Sep. 2003.

* cited by examiner

Level 4

Level 3

Level 2

Level 1

SYSTEM AND METHOD FOR 3D OBJECT RECOGNITION

FIELD OF THE INVENTION

This invention relates generally to machine vision systems, and more particularly, to visual recognition of 3D objects in an image as well as to determination of their 3D pose.

BACKGROUND OF THE INVENTION

Object recognition is part of many computer vision applications. In some cases, the object is assumed to be planar and the transformation of the object in the image is limited to a certain degree, for example, to similarity transformations or projective transformations. There is a multitude of matching approaches of various types available in literature that are already able to solve this task. A survey of matching approaches is given by Brown (1992). In most cases, the model of the object is generated from an image of the object. Two examples for such approaches that fulfill the requirements for industrial applications, i.e., fast computation, high accuracy, robustness to noise, object occlusions, clutter, and contrast changes are presented in EP 1,193,642 and by Ulrich et al. (2003).

However, in many applications the object to be recognized is not planar but has a 3D shape and is imaged from an unknown viewpoint, because the object moves in 3D space in front of a fixed camera, the camera moves around a fixed object, or both, the object as well as the camera move simultaneously. This complicates the object recognition task dramatically because the relative movement between camera and object results in different perspectives that cannot be expressed by 2D transformations. Furthermore, not only a 2D transformation has to be determined but the full 3D pose of the object with respect to the camera. The 3D pose is defined by the six parameters of the 3D rigid transformation (three translation and three rotation parameters), which describes the relative movement of the object with respect to the camera. Different techniques have been developed for visually recognizing a 3D object in one image. They can be grouped into feature-based techniques and view-based techniques. Besides these approaches, there are approaches that use more information than only one image to recognize 3D objects, e.g., two images (e.g., Sumi and Tomita, 1998) or one image in combination with a range image (e.g., US 2005/0286767). The latter approaches are not discussed here, because they differ too much from this invention.

Feature-based techniques are based on the determination of correspondences between distinct features of the 3D object and their projections in the 2D search image. If the 3D coordinates of the features are known, the 3D pose of the object can be computed directly from a sufficiently large set (e.g., four points) of those 2D-3D correspondences.

In one form of the feature-based techniques, distinct manually selected features of the 3D object are searched in the 2D search image (e.g., U.S. Pat. No. 6,580,821, U.S. Pat. No. 6,816,755, CA 2555159). The features can be either artificial marks or natural features, e.g., corner points of the 3D object or points that have a characteristically textured neighborhood. Typically, templates are defined at the position of the features in one image of the object. In the search image, the features are searched with template matching. Several drawbacks are associated with these approaches: In general, it is difficult to robustly find the features in the image because of changing viewpoints, which results in occluded and perspectively distorted features. Template matching methods cannot cope with this kind of distortions. Consequently, these approaches are only suited for a very limited range of viewpoint changes. In addition, marker-based approaches are not flexible with regard to changing objects. It is often difficult to add the markers and to measure their 3D coordinates. Furthermore, many objects are not suited for adding markers to their surface.

Another form of feature-based recognition techniques eliminates this restriction by using features that are invariant under perspective transformations (e.g., US 2002/0181780, Beveridge and Riseman, 1995, David et al., 2003, Gavrila and Groen, 1991). For example, in Horaud (1987), linear structures are segmented in the 2D search image and intersected with each other to receive intersection points. It is assumed that the intersection points in the image correspond to corner points of adjacent edges of the 3D model. To obtain the correct correspondences between the 3D corner points of the model and the extracted 2D intersection points several methods are available in literature (Hartley and Zisserman, 2000, US 2002/0181780). The advantage of these feature-based approaches is that the range of viewpoints is not restricted.

Furthermore, there are generic feature-based approaches which are able to detect one kind of 3D object without the need for a special 3D model of the object. One example is given in U.S. Pat. No. 5,666,441, where 3D rectangular objects are detected. First, linear structures are segmented in the image. Intersections of at least three of these linear structures are formed and grouped together in order to detect the 3D rectangular objects. Because no information about the size of the object is used, the pose of the object cannot be determined with this approach. Naturally, these kinds of feature-based approaches are not flexible with regard to changing objects. They can detect only those objects for which they are developed (3D rectangular objects in the above cited example).

In general, feature-based recognition techniques suffer from the fact that the extraction of the features cannot be carried out robustly with respect to clutter and occlusions. Furthermore, the correct assignment of the extracted 2D features to the 3D features is a NP complete combinatorial problem, which makes these techniques not suited for industrial applications, where a fast recognition is essential.

View-based recognition techniques are based on the comparison of the 2D search image with 2D projections of the object seen from various viewpoints. The desired 3D pose of the object is the pose that was used to create the 2D projection that is the most similar to the 2D search image.

In one form of the view-based recognition, a model of the 3D object is learned from multiple training images of the object taken from different viewpoints (e.g. U.S. Pat. No. 6,526,156). The 2D search image is then compared to each of the training images. The pose of the training image that most resembles the 2D search image is returned as the desired object pose. Unfortunately, the acquisition of the training images and their comparison with the 2D search image is very costly because of the very large number of training images that are necessary to cover a reasonably large range of allowed viewpoints. What is more, this form of view-based recognition is typically not invariant to illumination changes, especially for objects that show only few texture. These problems make this approach not suited for industrial applications.

In another form of the view-based recognition, the 2D projections are created by rendering a 3D model of the 3D object from different viewpoints (e.g., U.S. Pat. No. 6,956,569, US 2001/0020946), CA 2535828). Again, there is the problem of the very large number of 2D projections that is necessary to cover a reasonably large range of allowed viewpoints. To cope with this, pose clustering techniques have been introduced (e.g., Munkelt, 1996). But even then, the number of 2D projections that must be compared with the 2D search image remains too large, so that these view-based recognition techniques are not suited for industrial applications. Often the number of views is reduced by creating the views such that the camera is always directed to the center of the 3D object, but then, objects appearing not in the center of the image cannot be found because of the resulting projective distortions. Another unsolved problem of these view-based recognition techniques is the creation of the 2D projections such that they are suitable for the comparison with the 2D search image. Approaches that use a realistically rendered 2D projection (U.S. Pat. No. 6,956,569) are not invariant to illumination changes because the appearance of object edges varies with the illumination direction. This problem can be reduced, but not eliminated, by the use of texture (US 2001/0020946). Other approaches create a model by extracting feature points in the images of the different sampled viewpoints and train a classifier using a point descriptor (e.g., Lepetit, 2004). Also in the search image, feature points are extracted and classified using the output of the point descriptor. Finally, the most likely 3D pose is returned. Unfortunately, this kind of approaches strongly relies on a distinct texture on the object's surface, and hence is not suitable for most industrial applications. Approaches that use only a wireframe projection of the 3D model face the problem that many of the projected edges are not visible in the search image, especially on slightly curved surfaces, which are typically approximated by planar triangles in the 3D model of the object. Often, the techniques that are used for the comparison of the 2D projections with the 2D search image are not robust against clutter and occlusions (Ulrich, 2003). Finally, the accuracy of the object pose determined by pure view-based approaches is limited to the distance with which the allowed range of viewpoints is sampled.

SUMMARY OF THE INVENTION

This invention provides a system and method for recognizing a 3D object in a single camera image and for determining the 3D pose of the object with respect to the camera coordinate system. The invention provides methods that substantially eliminate many of the prior-art problems of view-based object recognition methods just described.

In a first aspect, the invention provides a method for constructing a 3D model for 3D object recognition comprising the following steps: (a) providing the interior parameters of the camera; (b) providing a geometric representation of a 3D object; (c) providing a range of poses in which the 3D object may appear with respect to the camera; (d) creating virtual views of the 3D object by sampling the range of poses for different image resolutions, e.g., for the levels of an image pyramid; (e) representing all views by a tree structure where views on the same pyramid level reside at the same hierarchy level in the tree; and (f) for each view creating a 2D model that can be used to find the 2D view in an image by using an appropriate 2D matching approach.

According to a second aspect, the invention provides a method for recognizing a 3D object and for determining its 3D pose from one image of the object comprising the following steps: (a) providing a 3D model of the 3D object; (b) providing an electronic search image of the 3D object; (c) creating a representation of the search image containing different resolutions of the search image, e.g., an image pyramid; (d) matching the 2D models that do not have a father view in the hierarchical tree structure to the image of the respective level of the image pyramid; (e) verifying and refining the 2D matches of the top pyramid level by tracking them down to the lowest pyramid; (f) determining the initial 3D object pose from the 2D matching pose and the respective 3D view pose; and (g) refining the initial 3D object poses.

In accordance with a third aspect, the invention provides a method for augmenting a 3D model with texture information: (a) providing some example images of the 3D object; (b) determining the 3D pose of the 3D object in each of the example images; (c) for each example image projecting each face of the 3D model into the example image using the 3D pose determined in step (b); (d) for each object face rectifying the part in the example image that is covered by the projected face using the 3D pose of the face; and (e) augmenting the 2D models with the derived texture information of the rectified textured object faces, resulting in 2D models containing both geometric information as well as texture information.

In the first step, the camera is calibrated to achieve a high accuracy of the final 3D object pose. Furthermore, the calibration allows to use a camera lens for object recognition that even has significant distortions.

Then, a 3D model is trained based on a 3D representation of the object, e.g., a 3D CAD model. For this, views of the 3D object are generated within the user-specified pose bounds. In the preferred embodiment of the invention the object is assumed to be at the center of a sphere that defines a spherical coordinate system. Thus, the range of camera positions that is to be included in the 3D model can be expressed by specifying intervals for the spherical coordinates longitude, latitude, and distance. Optionally, the camera roll angle can be limited to a range smaller than 360° by passing appropriate values to the model training. During the training (offline-phase), the camera is assumed to be always directed to the center of the object.

The sampling of the views within the pose range is automatically determined during the training process. The advantages of the automatically computed sampling are that the user does not need to specify parameter values for the sampling and the sampling can be chosen such that robustness and speed of the object recognition is maximized. To further increase the speed of the recognition, the model is created on multiple pyramid levels. Because higher pyramid levels allow a coarser sampling of the views, the computation of the views is performed for each pyramid level separately. Starting with an over-sampling, neighboring views are successively merged by using appropriate similarity measures until the sampling is found to be optimal for the original image resolution. To obtain the sampling on the next higher pyramid level, the thresholds for the similarity measures are relaxed in accordance with the lower image resolution and the views are further merged until even those thresholds are violated. This process is repeated until a maximum number of pyramid levels is reached. The relations between views on different pyramid levels are stored in the 3D model. With this information it is possible to query for a given view on a higher pyramid level the views on the next lower pyramid level that have been merged to create the view on the higher level. This information is stored in a tree structure. Each node in the tree represents one view. Views on the same pyramid level reside on the same hierarchy level in the tree. Because of the tree structure, each parent node is connected to one or more child nodes, whereas each child node is connected to at most one parent node. Additionally, the 3D pose of each view is stored in the 3D model.

For each pyramid level and each view on this level a 2D model is created. For this, the 3D representation of the object is projected into the image plane using the camera pose that is represented by the current view. As a result a three-channel image is obtained, where the three channels represent the three elements of the normal vector of the faces of the 3D object. The advantage of using this three-channel image projection is that the edge amplitude in this image is directly related to the angle between two neighboring faces of the 3D object. In a preferred embodiment of the invention the 2D model representation includes the edge positions as well as the direction of each edge. Often, the 3D description of the model contains a lot edges that are not visible in a true image of the object. For example, such edges result from triangulation methods of the CAD software that are used to approximate curved surfaces by a sufficient number of planar faces. Consequently, these edges must not be included in the 2D model. They can be suppressed by specifying a minimum value for the angle difference between the normal vectors of two neighboring faces in the 3D object. Because of the chosen projection mode, this minimum angle can easily be transformed to a threshold value to the edge amplitude in the three-channel image. Finally, the 2D model is generated from the three-channel image on the associated image pyramid level. In a preferred embodiment of the invention the similarity measure that is presented in EP 1,193,642 is used for the 2D matching. It is robust to occlusions, clutter, and non-linear contrast changes. The 2D model consists of a plurality of edge points with a corresponding gradient directional vector, which can be obtained by standard image preprocessing algorithms, e.g., edge detection methods. The similarity measure is based on the dot product of the edge gradient direction. Alternatively, any other edge-based 2D-matching approach can be used in the invention instead, e.g., approaches that are based on the mean edge distance (Borgefors, 1988), approaches that are based on the Hausdorff Distance (Rucklidge, 1997), or approaches that are based on the generalized Hough transform (Ballard, 1981 or Ulrich et al., 2003). In the last step, it is verified whether the created 2D model still shows enough distinct characteristics that are necessary to distinguish the model from clutter in the image. If this is not the case, the 2D model of this view and pyramid level is discarded.

In the online-phase the created 3D model is used for recognizing the 3D object in a single camera image and for determining the 3D pose of the object with respect to the camera coordinate system. First, an image pyramid is built from the input image. The recognition starts at the highest pyramid level on which at least one valid 2D model is available. All 2D models on this pyramid level are searched, e.g., by computing the similarity measure that is presented in EP 1,193,642 between the 2D models of the views and the current image pyramid level. Alternatively, any other edge-based 2D-matching approach can be used in the invention instead, e.g., approaches that are based on the mean edge distance (Borgefors, 1988), approaches that are based on the Hausdorff Distance (Rucklidge, 1997), or approaches that are based on the generalized Hough transform (Ballard, 1981 or Ulrich et al., 2003). For the search, the 2D models are rotated and scaled in the necessary range and the similarity measure is computed at each position of the scaled and rotated 2D models in the image. The 2D poses (position, rotation, scaling) of matches that exceed a certain similarity measure are stored in the list of match candidates. On the next lower pyramid levels all 2D models that do not have a parent node in the tree are searched in the same way as the views on the highest pyramid level. Additionally, the match candidates that have been found on the previous pyramid level are refined. The refinement is performed by selecting all child views in the tree and computing the similarity measure between the 2D models of the child views and the current image pyramid level. However, it is sufficient to compute the similarity measure only in a very restricted parameter range according to the match of the parent view. This means that the range of investigated positions, rotations, and scalings can be limited to the close neighborhood of the parent match. This process is repeated until all match candidates are tracked down to the lowest pyramid level. The combination of a pyramid approach with hierarchical model views that are arranged in a tree structure is essential for real-time applications and has not been applied in previous recognition approaches.

Unfortunately, the tracking as described above will fail if the camera is not directed to the center of the object, and hence, the object does not appear in the image center. Because the 2D models that have been created during the training are created by assuming a camera that is directed to the object center, the 2D model and the projected model in the image are related by a 2D projective transformation. The parameters of this transformation can be computed if the position of the object in the image is known. Therefore, before a match candidate is tracked to the next lower pyramid level, the 2D models of its child views are projectively corrected according to the position of the match candidate. This is an absolutely essential step that has not been applied in previous view-based recognition approaches.

As the result of the matching one obtains the 2D poses of the 2D matches in the image that exceed a certain similarity measure. For each match the corresponding 3D object pose can be computed based on the 2D matching pose and the 3D pose of the model view that is associated with the match. The accuracy of the obtained 3D pose is limited to the sampling of the views and the sampling of the 2D poses during the 2D matching, i.e., position, rotation, scaling. For practical applications, this is not sufficient. Therefore, a pose refinement step is essential to allow practical applications. The 3D pose refinement is performed by using a least-squares adjustment. For this, the 3D object is projected into the search image by using the 3D pose that is obtained by the matching. The projected model edges are sampled to discrete points using a suitable sampling distance. For each sampled edge point a corresponding subpixel precise image edge point is searched in the neighborhood of the sampled edge point. The refined 3D pose is obtained by minimizing the squared distances between all image edge points and the projected model edges.

Several extensions to the described approach are possible. For example, if the camera lens has significant distortions, they should be eliminated before applying the matching. This can easily be done by rectifying the search image, thus obtaining an image that is free from distortions. The matching can then be performed in the rectified image.

A second extension can be applied if the camera setup shows strong perspective distortions. The smaller the focal length is and the bigger the depth of the object is the stronger the perspective distortions are in the image. In this case, the projective correction that is applied during the tracking (see above) may not be sufficient. Instead, the projective distortion must be taken into account already on the highest pyramid level. Therefore, the top pyramid level is transformed by applying a spherical mapping. The spherical mapping significantly reduces the effect of the perspective distortions, and hence allows for obtaining a high similarity measure for the object even if it does not appear in the image center. Accordingly, the same spherical mapping must be applied to the 2D models that are used on the top pyramid level.

If the object shows a characteristic texture, the present invention can easily be extended to benefit from this additional information. In a preferred embodiment of the invention the user provides some example images of the object after generating the 3D model. In the first step, the 3D model is used to determine the 3D pose of the object in the example images and automatically extracts the object texture from the example images. In the second step, the 3D model is augmented by adding the texture information to the 2D models.

In order to reduce the number of necessary views in the 3D model, and hence to reduce the memory consumption as well as the run-time of the 3D object recognition, the similarity measure presented in EP 1,193,642 can be made more tolerant to small changes in the view pose. This can be achieved by expanding the gradient direction that is used for the calculation of the similarity measure in the search image to both sides of the edges.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENTS

Figure 1:
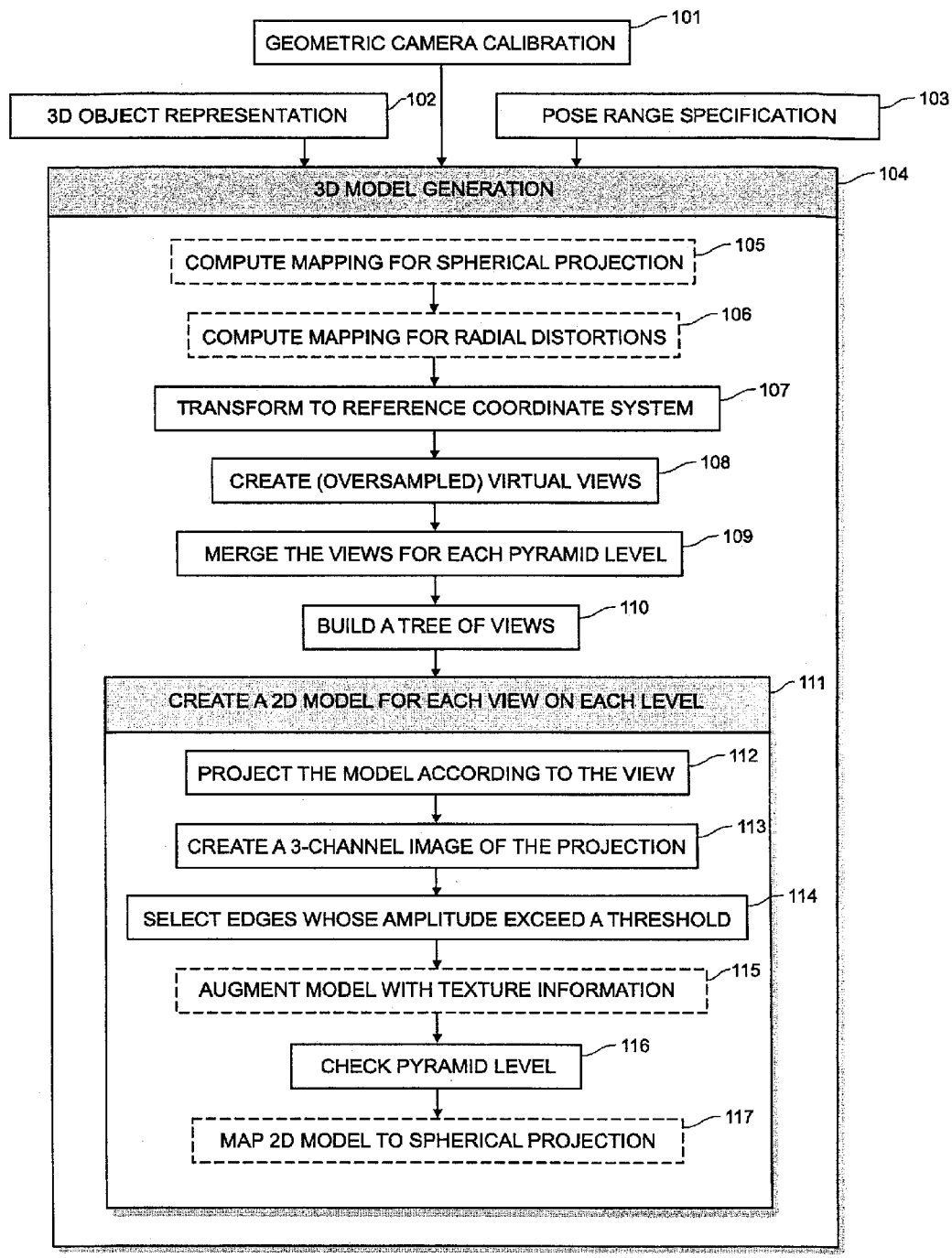
FIG. 1 is a flow chart of the offline phase, i.e., of the 3D model generation.
Figure 2:
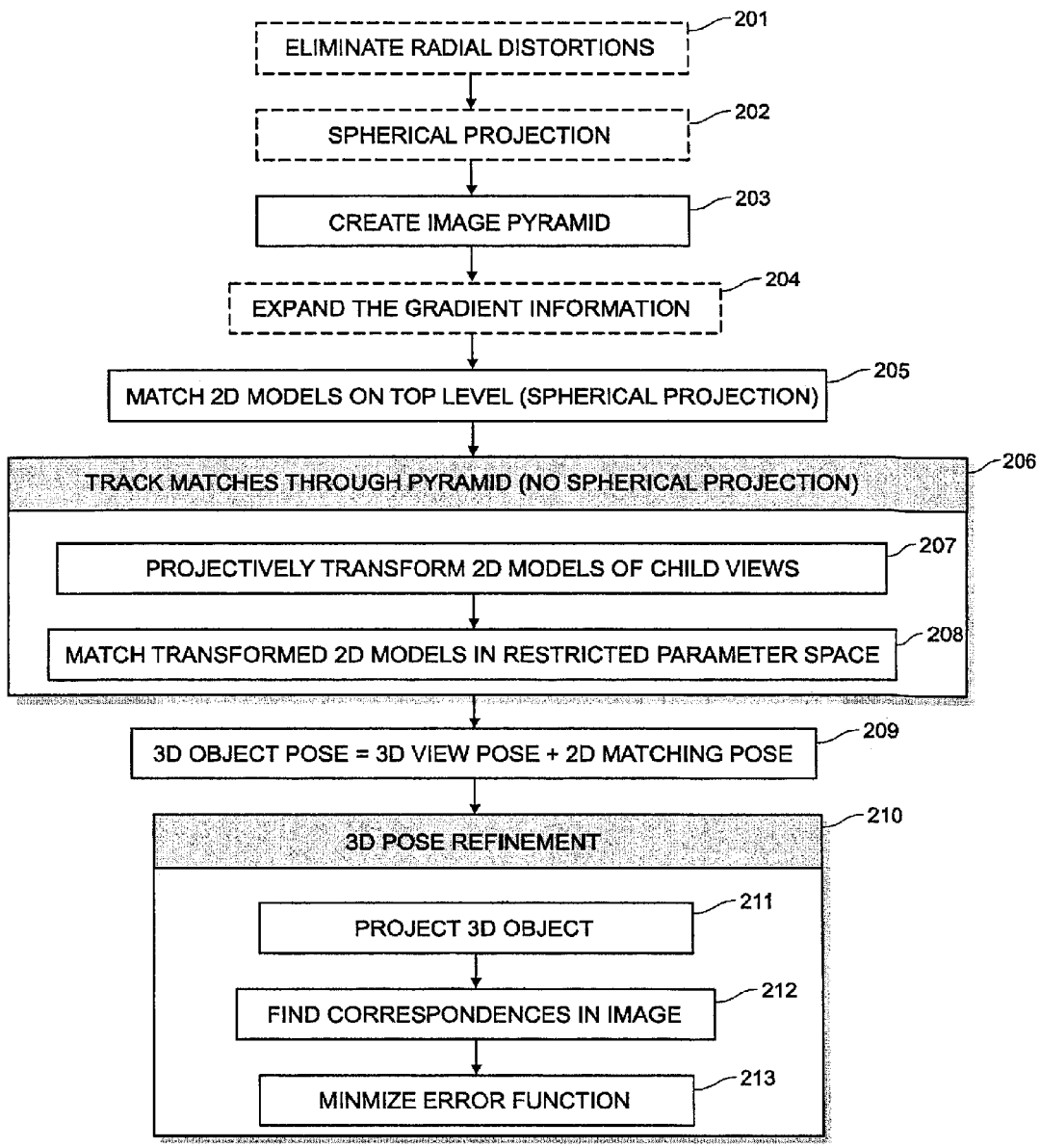
FIG. 2 is a flow chart of the online phase, i.e., of the recognition of the 3D object in an image as well as of the 3D pose determination of the object.

In the following, the single steps of the present invention are described in detail. First, the geometric camera calibration that is the initial step to obtain a high accuracy. After that, some information is given of how the 3D object should be represented. In the next section, the generation of the 3D model that can be used to find the 3D object in a search image is explained. The 3D model generation will be denoted as offline-phase in the remainder of the description. Then, methods are described that can be used to recognize the object in an image. This step will be denoted as online-phase in the remainder of the description. The described steps of the offline-phase are summarized in the flow chart of FIG. 1, the described steps of the online-phase are summarized in the flow chart of FIG. 2. In both flow charts, essential steps are indicated by a solid box, whereas optional steps are indicated by a dashed box. Finally, a robot vision system is introduced that makes use of the presented methods. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited by the embodiment shown, but is to be accorded the widest scope consistent with the principles and features disclosed herein.

Geometric Camera Calibration

Figure 3:
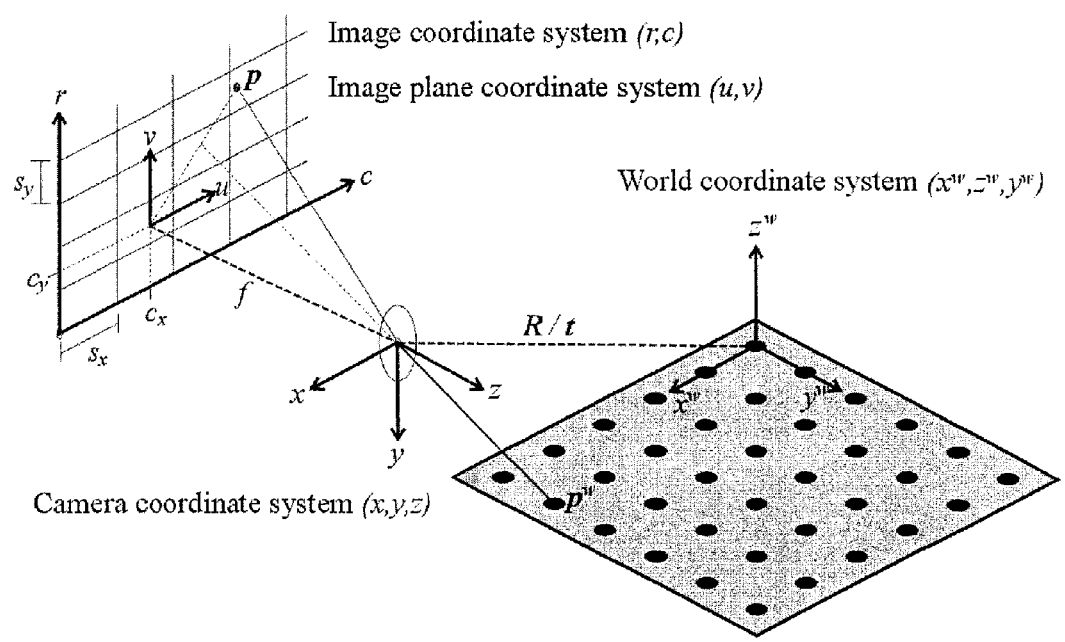
FIG. 3 is an illustration of the camera model that is used during the geometric camera calibration.

Geometric camera calibration (at 101) is a prerequisite for the extraction of precise 3D information from imagery in computer vision, robotics, photogrammetry, and other areas. Two major benefits of using 3D camera calibration can be mentioned. First, metric 3D information can only be derived from the image if the interior parameters of the camera are known. Second, lens distortions may significantly falsify image measurements, and hence must be explicitly modeled and determined during the calibration process. Consequently, without camera calibration, the accuracy of an object recognition approach that is necessary for many applications cannot be achieved. In the preferred embodiment of the invention the camera model introduced by (Lenz, 1987) is used, where a pinhole camera with radial distortions is assumed (FIG. 3). The calibration of the camera is done following the approach described in (Lanser et al. 1995). Here, multiple images of a planar calibration target with circular marks of known position are used for calibration (FIG. 3). Alternatively, other models or calibration methods can easily be integrated in the invention without departing from the scope of the invention. This might be necessary, for example, if the used lens shows more complex distortions that are insufficiently modeled using only the radial component. As the result of the calibration, the interior camera parameters (f, $\kappa$, $s_x$, $s_y$, $c_x$, $c_y$) are obtained, where f is the focal length, $\kappa$ describes the radial distortions, $s_x$ and $s_y$ are the distances of the sensor elements on the sensor in x and y direction, respectively, and $(c_x, c_y)^T$ is the position of the principal point in the image. The mapping from a 3D point $P_c=(x,y,z)$, which is given in the camera coordinate system, into pixel coordinates $p=(r,c)^T$ in the image coordinate system is done by the following three steps (see FIG. 3):

1. Projection of the 3D point given in the camera coordinate system into the image plane:

$$u = f\frac{x}{z}, v = f\frac{y}{z}$$

2. Applying the radial distortions:

$$\tilde{u} = \frac{2u}{1 + \sqrt{1 - 4\kappa(u^2 + v^2)}},$$

$$\tilde{v} = \frac{2v}{1 + \sqrt{1 - 4\kappa(u^2 + v^2)}}$$

Here the radial distortions are described by the parameter $\kappa$. If $\kappa$ is negative, the distortions are barrel-shaped, while for positive $\kappa$ they are pincushion-shaped. This model for the lens distortion has the advantage that is can be easily inverted in order to calculate the correction of the distortions analytically:

$$u = \frac{\tilde{u}}{1 + \kappa(\tilde{u}^2 + \tilde{v}^2)},$$

$$v = \frac{\tilde{v}}{1 + \kappa(\tilde{u}^2 + \tilde{v}^2)}$$

3. Transforming the 2D image point $(\tilde{u}, \tilde{v})^T$ into pixel coordinates $p=(r,c)^T$:

$$r = \frac{\tilde{v}}{s_y} + c_y,$$

$$c = \frac{\tilde{u}}{s_x} + c_x$$

3D Object Representation

The invention can deal with arbitrary rigid 3D objects. Typically, the 3D objects are represented by a CAD model or a similar 3D description, which can be generated with one of several available CAD software tools (at 102). Since most CAD software tools are able to export the 3D description in form of a DXF file, the preferred embodiment of the invention supports the import of a DXF file of the 3D object. Alternatively, any other representation that is able to describe the geometry of a 3D solid is suited as well. It is assumed that the object is represented by a set of planar faces. If the model contains curved surfaces like cylinders, spheres, or arbitrarily curved surfaces, these surfaces must be approximated by a sufficiently large set of planar faces that are bordered by straight edges. In most cases, the planar-face-approximation is part of the CAD software. Otherwise, one of several available well-known standard approaches like, for example, the one presented in (Rypl, 2003), can be used to approximate the curved surfaces by planar faces. A comprehensive survey of triangulation methods is given in (Bern and Eppstein, 1992).

3D Model Generation

Figure 4A:
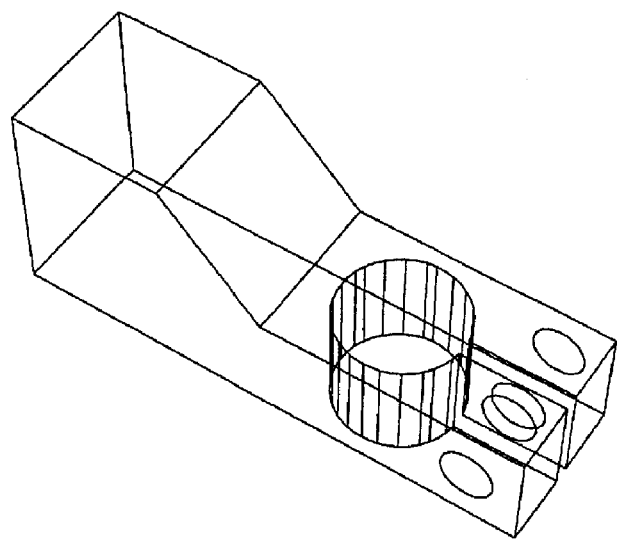
FIG. 4A shows an example of a 3D object that consists of mainly planar surfaces as well as of a cylinder.
Figure 4B:
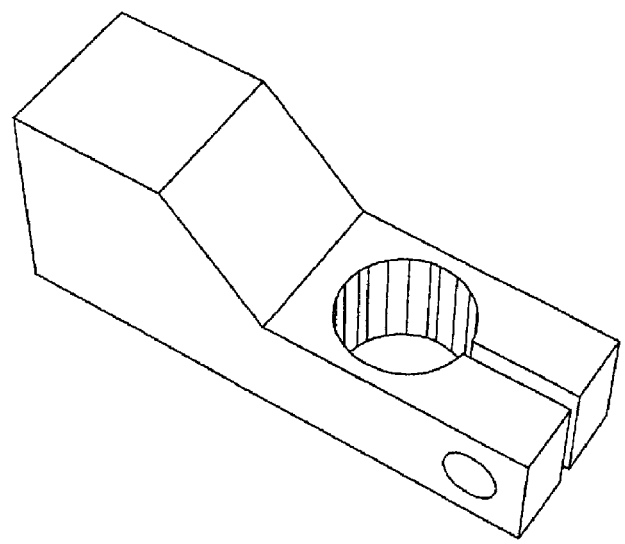
FIG. 4B shows the 3D object of FIG. 4A visualized with its hidden lines removed.

In the first step of the 3D model generation (at 104), the 3D object is converted into an internal representation, which describes the object as a set of planar faces that are bordered by closed polygons. FIG. 4A shows an example object that consists of mainly planar surfaces as well as of a cylinder. The latter is approximated by several planar rectangles. Furthermore, the four smaller circles are approximated by polygonal faces. For visualization purposes, FIG. 4B shows the same object with hidden lines removed.

Figure 5A:
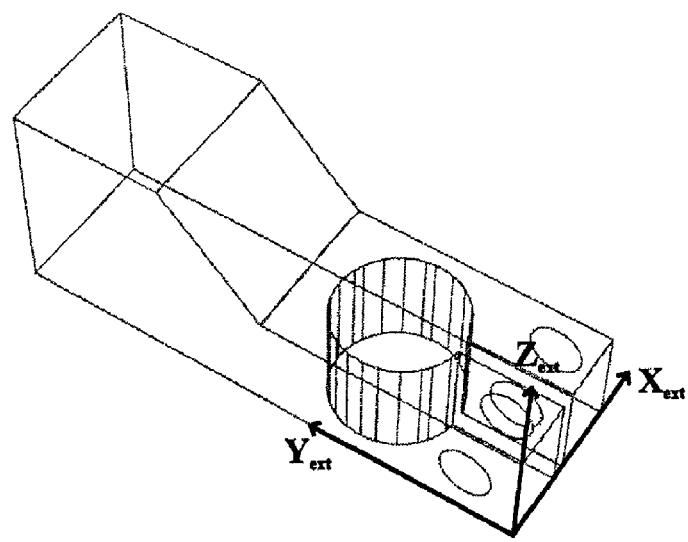
FIG. 5A shows the original coordinate system of the external 3D object representation, like it is defined in a DXF file, for example.
Figure 5B:
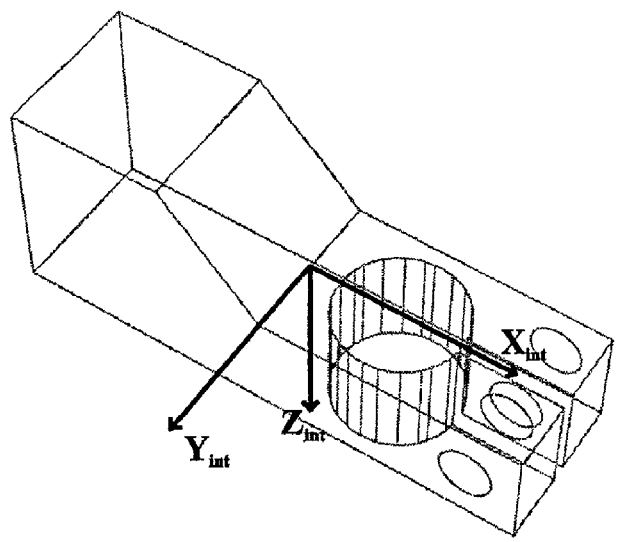
FIG. 5B shows the internally used reference coordinate system that is obtained by translating the original coordinate system to the origin and rotating it to the reference orientation.

Then, the internally used object coordinate system is defined (at 107). In the preferred embodiment of the invention the center of the coordinate system is moved to the center of the 3D object, i.e., the center of the 3D bounding box of the object. In an alternative embodiment, the object coordinate system is adopted from the external representation, e.g., from the DXF file. In another alternative embodiment the user specifies the center of the coordinate system. Optionally, the orientation of the coordinate system can be changed by the user in order to specify a reference orientation of the object. The reference orientation specifies the mean orientation of the object during the search. It can be changed to facilitate a more convenient way for the user to specify the pose bounds in which the 3D model is to be created or searched. FIG. 5A shows the original coordinate system of the external representation while FIG. 5B shows the coordinate system after translating it to the origin and rotating it to the reference orientation. Consequently, a 3D point next given in the original coordinate system can be transformed into $P_{int}$, given in the internally used reference coordinate system, by applying a rigid 3D transformation, which can be written as $P_{int}=RP_{ext}+T$, where R is a 3×3 rotation matrix and T is a translation vector. From now on, all computations refer to the internal reference coordinate system. The resulting 3D poses that are obtained by the 3D object recognition are transformed back to the original coordinate system before returning them to the user.

Figure 6A:
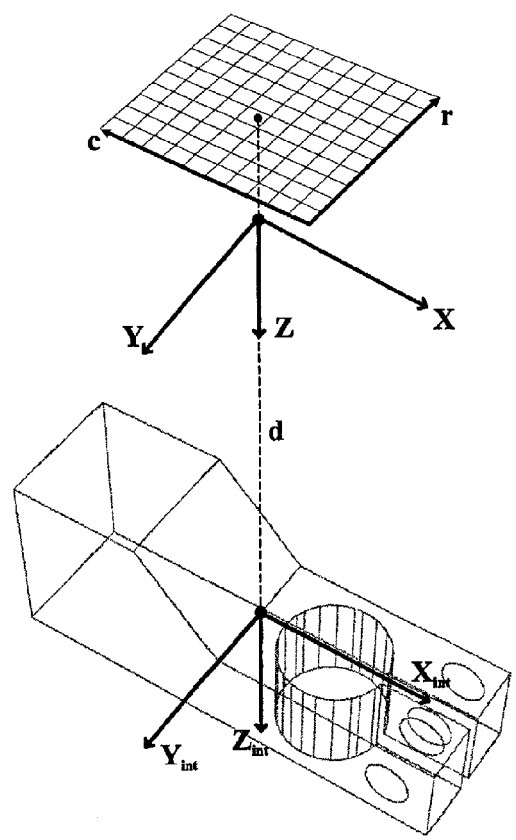
FIG. 6A is a visualization of the reference pose.
Figure 6B:
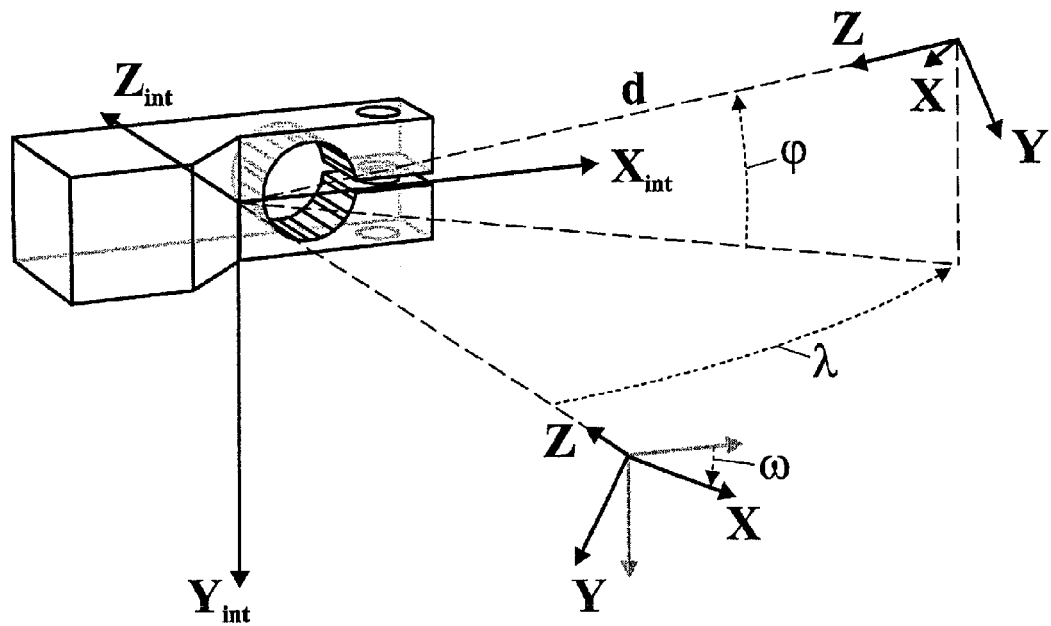
FIG. 6B is a visualization of the spherical coordinate system that is used to describe the pose range.

Then, a 3D model is trained based on a 3D representation of the object, e.g., a 3D CAD model. For this, different views of the object are generated within the user-specified pose bounds. The views are automatically generated by placing virtual cameras around the 3D object and projecting the object into the image plane of each virtual camera. In the preferred embodiment of the invention the object is assumed to be at the center of a sphere that defines a spherical coordinate system. The virtual cameras, which are used to create the views, are arranged around the object in such a way that they all look at the origin of the coordinate system, i.e., the Z axes of the cameras pass through the origin. The pose range can then be specified by restricting the views to a certain spherical quadrilateral around the origin. This naturally leads to the use of the spherical coordinates $\lambda$ (longitude), $\phi$ (latitude), and d (distance). Because during the training the camera is always directed to the center of the spherical coordinate system, the camera roll angle $\omega$ (rotation around the Z axis of the camera) is the only remaining degree of freedom that must be specified. Therefore, the camera pose is defined by the four parameters $\lambda$, $\phi$, d, and $\omega$. The definition of the spherical coordinate system is chosen such that the equatorial plane corresponds to the XZ plane of the Cartesian reference coordinate system with the Y axis pointing to the south pole (negative latitude) and the negative z axis pointing in the direction of the zero meridian. Consequently, a camera whose coordinate system has the same orientation as the internal reference coordinate system and that is only translated in negative Z direction by t with respect to the object reference coordinate system has the spherical coordinates $\lambda=0$, $\phi=0$, d=t, and a roll angle $\omega=0$ (see FIG. 6A). A camera with an arbitrary pose and the associated spherical coordinates are visualized in FIG. 6B.

Figure 7:
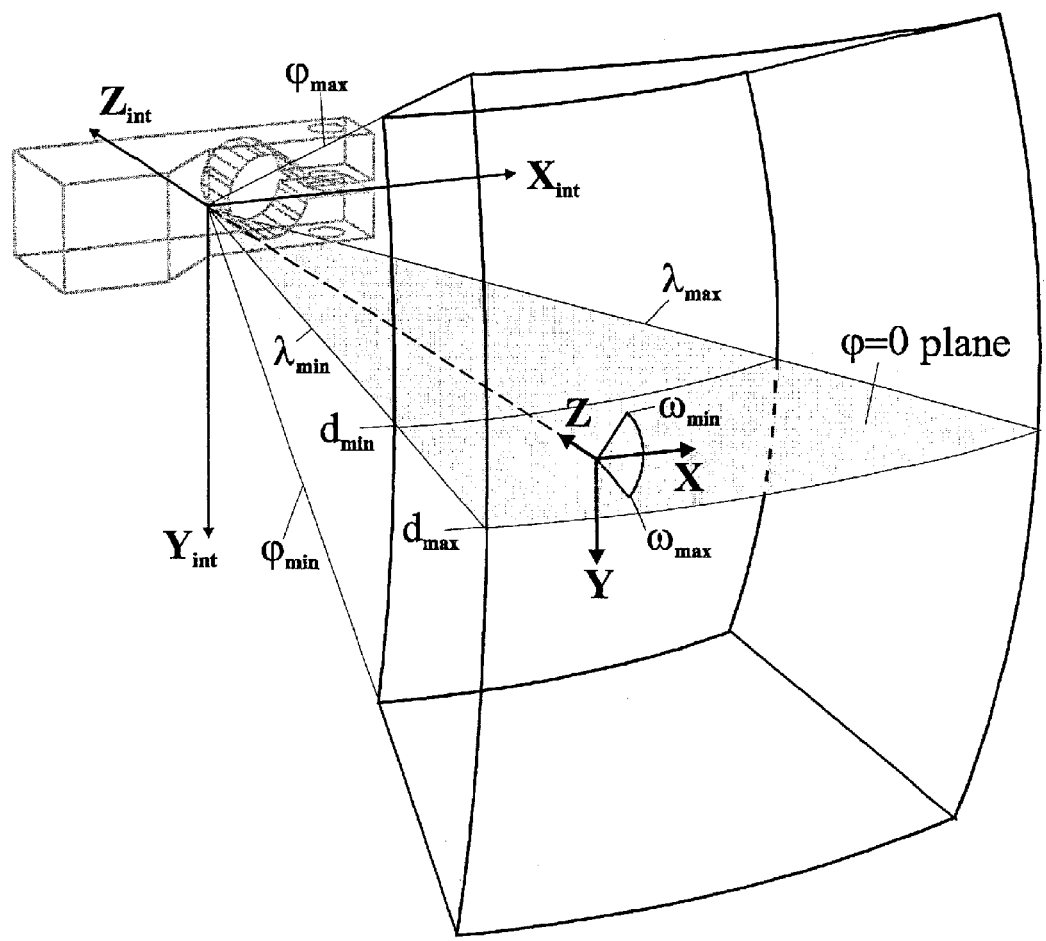
FIG. 7 is a visualization of an example pose range.

The pose range is determined by the user by specifying intervals for the spherical parameters and for the camera roll angle (at 103). FIG. 7 shows an example, where the longitude range is specified by the interval $[\lambda_{min}, \lambda_{min}]$, the latitude range is specified by the interval $[\phi_{min}, \phi_{min}]$, the distance range is specified by the interval $[d_{min}, d_{max}]$, and the range of camera roll angles is specified by the interval $[\omega_{min}, \omega_{min}]$. These values strongly depend on the application, i.e., the allowed relative movement of the camera with respect to the object. Furthermore, they highly influence the recognition time. The larger the intervals are chosen the slower the recognition will be during the online-phase. In most industrial applications the relative pose between camera and object does not vary too much. Typical values for the intervals for $\lambda$ and $\phi$ are [−45°, +45°], while $\omega$ is typically set to [−180°, +180°].

There are several other possible ways to determine the pose range that describes the relative movement of camera and object. They can be easily incorporated in the invention without departing from the scope of the invention. For example, one alternative way would be to specify the pose range by specifying limits for the Cartesian coordinates of the camera position, i.e., by specifying a cuboid in 3D space. In another alternative embodiment, the pose range is described by keeping the camera at a fixed pose and specifying the limits of the object's movement instead.

The sampling of the views within the pose range is automatically determined during the training process. The advantages of the automatically computed sampling are that the user does not need to specify parameter values for the sampling and the sampling can be chosen such that robustness and speed of the object recognition is maximized. To further increase the speed of the recognition, the model is created on multiple pyramid levels. Image pyramids are a common method to speed up image processing tasks (see e.g., Tanimoto, 1981). An image pyramid is computed by successively applying a smoothing and a sub-sampling operation to the original image leading to progressively smaller images. In 2D template matching systems that make use of image pyramids the search is typically started in a coarse (high) pyramid level, and continued in a local area at the next finer (lower) level where the similarity measure in the coarse level is promising. Because higher pyramid levels allow a coarser sampling of the views, the computation of the views is performed for each pyramid level separately.

During the view sampling only the camera positions are sampled. The camera roll angle does not need to be sampled because a changing camera roll angle does not change the view, and hence the perspective, but only represents a 2D rotation in the image plane. The view sampling starts on the lowest pyramid level by applying an over-sampling of the views (at 108). In one embodiment of the invention, the over-sampling is done by computing camera positions within the user-specified pose range that are equally distributed in 3D space. The sampling width can be determined by performing simple assessments based on the object size, the camera parameters, and the tolerance of the similarity measure that is used for matching the views in the online-phase. The only condition that this assessment must fulfill is that more initial views are generated than are at least required. In a preferred embodiment of the invention the similarity measure that is presented in EP 1,193,642 is applied. It is robust to occlusions, clutter, and non-linear contrast changes. The 2D model consists of a plurality of edge points with a corresponding gradient directional vector, which can be obtained by standard image preprocessing algorithms, e.g., edge detection methods. The similarity measure is based on the dot product of the edge gradient direction. Alternatively, any other edge-based 2D-matching approach can be used in the invention instead, e.g., approaches that are based on the mean edge distance (Borgefors, 1988), approaches that are based on the Hausdorff Distance (Rucklidge, 1997), or approaches that are based on the generalized Hough transform (Ballard, 1981 or Ulrich et al., 2003). In the preferred embodiment of the invention the initial views are not sampled equally in space because more views are required at a shorter camera-object distance than at larger distances. With this improvement the initial number of views can be reduced and the subsequent thinning out of surplus views is speeded up. To obtain the initial views, the Gaussian sphere is triangulated for different radii by using the approach described in (Munkelt, 1996). With increasing radius, the step width for the radius also increases.

The thinning out of the views (at 109) is performed by computing a similarity measure between all neighboring views, selecting the pair of views with the highest similarity, merging both views into one view and re-computing the similarities between the new view and its neighboring views. This process is repeated until the highest similarity is below a certain threshold for the current pyramid level. In one embodiment the similarity between two views is computed by projecting the object into the image plane of each view and computing the similarity between both projections by using the similarity measure that is applied in the online-phase. In an alternative embodiment, the object projection is approximated by only projecting the 3D bounding box instead of the complete 3D object. The similarity measure is then performed only on the approximate projection. This decreases the run-time of the 3D model generation. In another alternative embodiment, additionally the similarity measure is approximated as well. This has the advantage that no image of the projected bounding box must be generated, which is necessary when using the original similarity measure. Alternatively, other approximations that help to speed up the projection or the similarity calculation are possible as well. In a preferred embodiment these approximations are combined in a hierarchical manner: First, the fastest approximation is used to merge the views until the highest similarity is below a certain threshold. Then the merging of the remaining views is continued by using the second fastest approximation, and so on. This approach, on the one hand, reduces the computation time and, on the other hand, ensures to obtain a similar result that would be obtained when performing the merging without the approximation. For the hierarchical approach to work, it must be ensured that the approximations underestimate the next slower approximation or the original similarity measure, respectively.

Figure 8A:
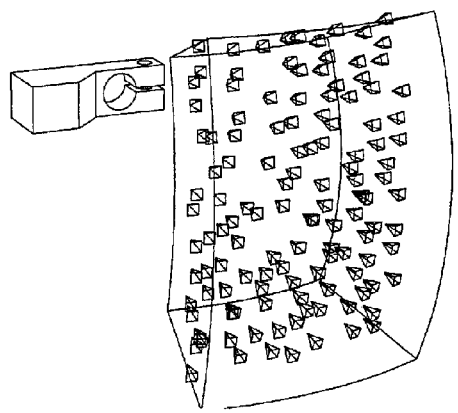
FIG. 8A is a visualization of the views on pyramid level 1.
Figure 8B:
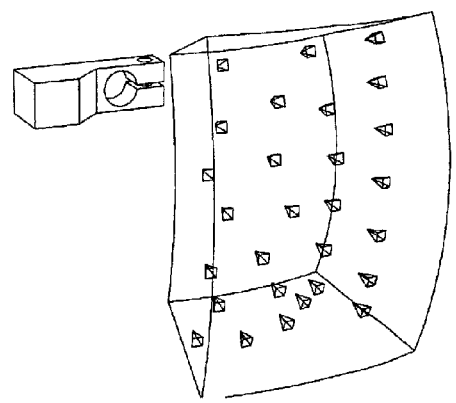
FIG. 8B is a visualization of the views on pyramid level 2.
Figure 8C:
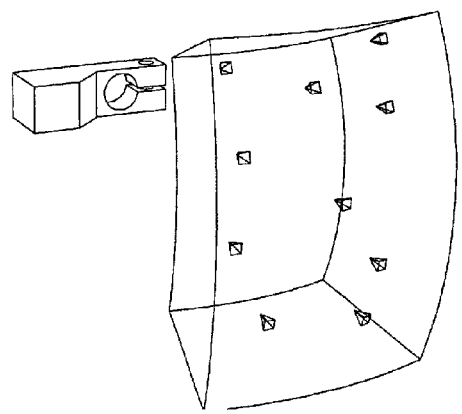
FIG. 8C is a visualization of the views on pyramid level 3.
Figure 8D:
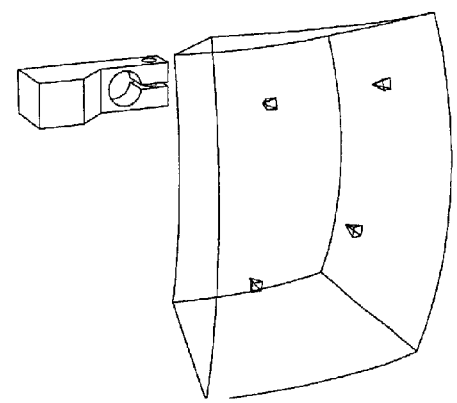
FIG. 8D is a visualization of the views on pyramid level 4.

If no pair of object views whose similarity exceeds the threshold is left, the remaining views are copied into the 3D model. As mentioned above the model is created on multiple pyramid levels. The views computed so far are stored in the lowest (original) pyramid level. In FIG. 8A for all views on the lowest pyramid level the corresponding cameras are visualized that are obtained when applying the described method to the pose range shown in FIG. 7. Here, a camera is visualized by a small square pyramid whose base represents the image plane and whose apex represents the optical center. In order to compute the views on the next higher pyramid level, the merging is continued while relaxing the similarity constraint. The relaxing must be introduced in the following two ways. In the first case, if the original similarity measure is computed, i.e., the similarity is based on images from the projected object, then the images are smoothed and sub-sampled to get the next higher pyramid level. Then the similarity measure is computed on the sub-sampled images. This automatically relaxes the similarity constraint since smaller dissimilarities are eliminated by reducing the image resolution. In the second case, if the similarity measure is approximated by an analytical computation, the sub-sampling must be taken into account by explicitly multiplying the position tolerance during the analytical computation of the similarity in accordance with the pyramid level. If no pair of object views whose similarity exceeds the threshold is left, the remaining views are copied into the corresponding level of the 3D model. In FIG. 8B, FIG. 8C, and FIG. 8D the views are visualized that are obtained for the second, third, and fourth pyramid level, respectively. In this example, it is sufficient to use only four different views on the fourth pyramid level.

Figure 9:
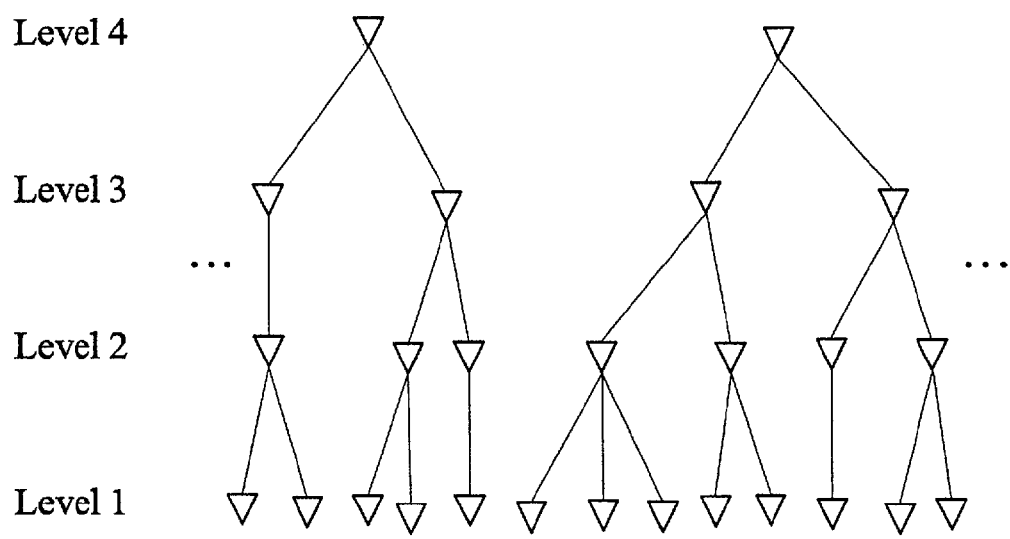
FIG. 9 is a simplified illustration of the view tree with four pyramid levels.

Additionally, at each view a reference to all child views is stored. The child views are those views on the next lower pyramid level that have been merged to obtain the view on the current pyramid level plus the views that could not be merged. Accordingly, at each child view a reference to its parent view is stored. With the reference to the child views it is possible to query for a given view on a higher pyramid level the views on the next lower pyramid level that have been merged to create the view on the higher level. This information is stored in a tree structure (at 110). FIG. 9 shows a simplified 1D version of the tree. Each node in the tree represents one view. Views on the same pyramid level reside on the same hierarchy level in the tree. Because of the tree structure, each parent node is connected to one or more child nodes, whereas each child node is connected to one parent node. Additionally, the 3D pose of each view is stored in the 3D model. This process is repeated for a maximum number of pyramid levels. Views on the highest pyramid level do not have a parent view, whereas views on the lowest pyramid level do not have a child view.

After the tree has been completely generated, for each pyramid level and each view on this level, a 2D model is created (at 111) by using the approach presented in EP 1,193, 642. The 2D model consists of a plurality of edge points with a corresponding gradient directional vector, which can be obtained by standard image preprocessing algorithms, e.g., edge detection methods. Alternatively, any other edge-based 2D-matching approach can be used in the invention instead. For this, the 3D representation of the object is projected into the image plane using the camera pose that is represented by the current view (at 112). Hidden lines are eliminated by using an appropriate hidden-line-algorithm, e.g., (Paterson and Yao, 1990). The projection is done in a way such that a three-channel image is obtained, where the three channels represent the three elements of the normal vector of the faces of the 3D object (at 113). This has the advantage that the edge amplitude that can be measured in this color image is directly related to the angle in 3D space between the normal vectors of two neighboring faces of the 3D object. Let us assume that the normal vectors of two neighboring faces are $N_1=(X_1,Y_1,Z_1)^T$ and $N_2=(X_2, Y_2, Z_2)^T$. When creating the three-channel image, the first face is painted into the image using the color $(R_1, G_1, B_1)=(X_1,Y_1,Z_1)$ while the second face is painted into the image using the color $(R_2, G_2, B_2)=(X_2, Y_2, Z_2)$. Let us further assume without loss of generality that the two projected faces cause a vertical edge in the image. When computing the edge amplitude in the image at the transition between the two faces one obtains the first derivatives in row and column direction in each of the three channels:

|  | Red channel | Green channel | Blue channel |
| --- | --- | --- | --- |
| Derivative in row direction | $gr_R = 0$ | $gr_G = 0$ | $gr_B = 0$ |
| Derivative in column direction | $gc_R = R_2 - R_1$ | $gc_G = G_2 - G_1$ | $gc_B = B_2 - B_1$ |

Since the edge runs in vertical direction all derivatives in row direction are 0. The edge amplitude in a color image can be obtained by computing the eigenvalues of the color tensor C (Di Zenzo, 1986):

$$C = \begin{pmatrix} grr & grc \\ grc & gcc \end{pmatrix}$$
$$= \begin{pmatrix} (gr_R)^2 + (gr_G)^2 + (gr_B)^2 & gr_R gc_R + gr_G gc_G + gr_B gc_B \\ gr_R gc_R + gr_G gc_G + gr_B gc_B & (gc_R)^2 + (gc_G)^2 + (gc_B)^2 \end{pmatrix}$$

Substituting the above derivatives yields:

$$C = \begin{pmatrix} 0 & 0 \\ 0 & (R_2 - R_1)^2 + (G_2 - G_1)^2 + (B_2 - B_1)^2 \end{pmatrix}$$

The edge amplitude A is the square root of the largest eigenvalue of C, and hence $$A = \sqrt{(R_2-R_1)^2 + (G_2-G_1)^2 + (B_2-B_1)^2}.$$

Figure 10:
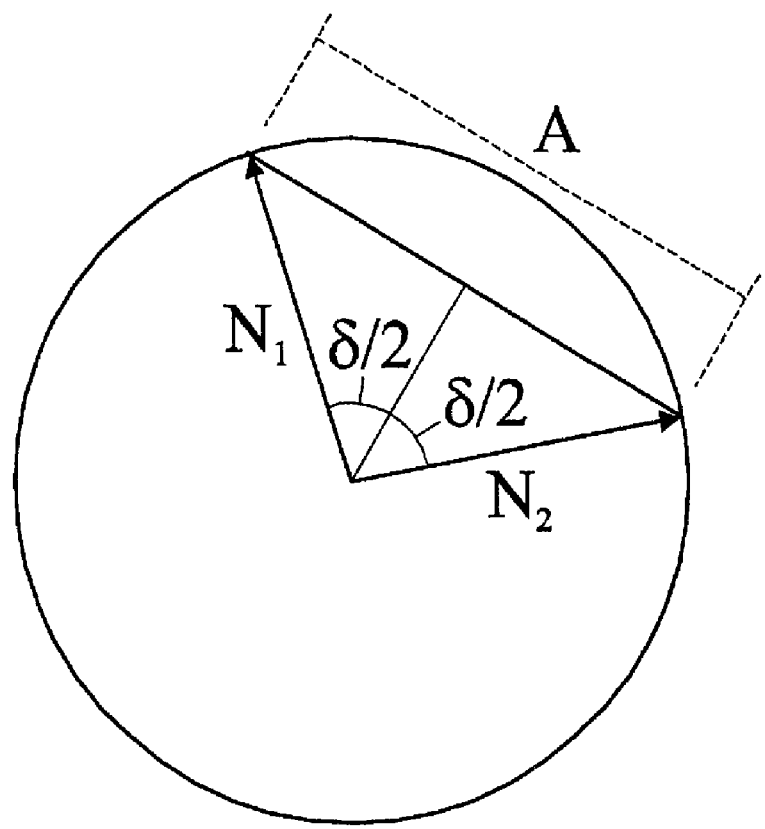
FIG. 10 is an illustration for the relation between the difference angle of the normal vectors of two neighboring object faces and the corresponding edge amplitude in a 3-channel image.

Thus, the edge amplitude computed in the image corresponds to the length of the difference vector of the two normal vectors. The two normal vectors (of length 1) span a two-dimensional isosceles triangle (see FIG. 10). Finally, the angle δ between both normal vectors, which also lies in the plane of the triangle, can be easily derived from the edge amplitude by using the following formula:

$$\delta = 2 \arcsin(A/2).$$

The obtained color image of the projected model serves as the model image and is passed to the model generation step of the approach presented in EP 1,193,642 extended by color edge extraction. Alternatively, any other edge-based 2D-matching approach can be used in the invention instead, e.g., approaches that are based on the mean edge distance (Borgefors, 1988), approaches that are based on the Hausdorff Distance (Rucklidge, 1997), or approaches that are based on the generalized Hough transform (Ballard, 1981 or Ulrich et al., 2003). First, the edge amplitude is computed in the model image (Di Zenzo, 1986). Only pixels that exceed a certain threshold are included in the model. Often, the 3D description of the model contains many edges that are not visible in a true image of the object. For example, such edges result from triangulation methods of the CAD software that are used to approximate curved surfaces by a sufficient number of planar faces. Consequently, these edges must not be included in the 2D model. For example, in FIG. 4B the edges of the planar faces that approximate the cylindrical hole must be suppressed. Because of the relation described above the user can suppress such edges by passing an appropriate threshold for the minimum face angle $\delta_{min}$. Then the minimum angle can easily be transformed to a threshold value $A_{min}$ that can be applied to the edge amplitude (at 114):

$$A_{min} = 2 \sin(\delta_{min}/2)$$

Because the silhouette of the projected object is a very important feature, it should not be suppressed in any case by the algorithm. This can easily be ensured by adding a constant c that is sufficiently large to each image channel (R,G,B)= (X+c,Y+c,Z+c) such that the edges of the silhouette fulfill the threshold criterion in any case. This can be achieved by setting c=3, for example.

Figure 11A:
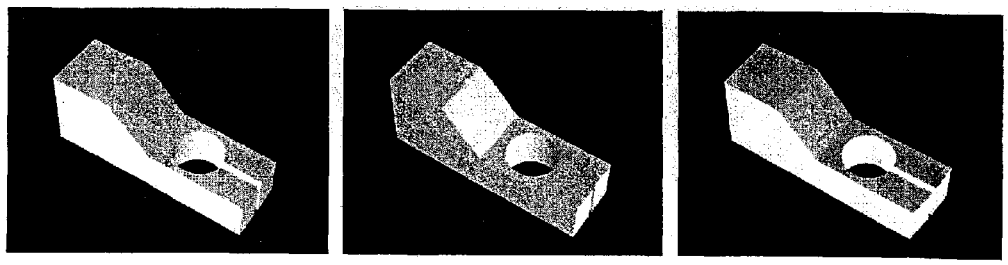
FIG. 11A shows the three channels of one sample view of the 3D object.
Figure 11B:
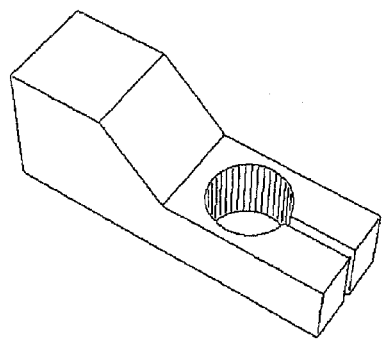
FIG. 11B shows the edges that are obtained when applying a wrong threshold to the edge amplitude of the three channel image shown in FIG. 11A.
Figure 11C:
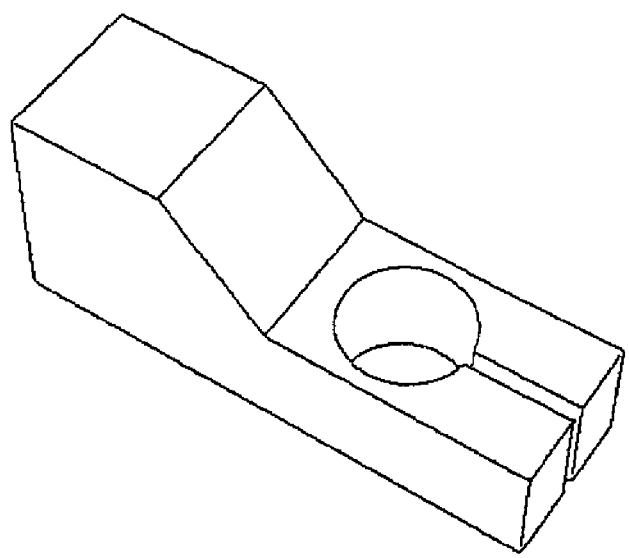
FIG. 11C shows the edges that are obtained when applying a correct threshold to the edge amplitude of the three channel image shown in FIG. 11A.

FIG. 11A shows the three channels of one sample view. In FIG. 11B, the edges are visualized that result when setting $\delta_{min}$ to 5°, and hence $A_{min}$=0.087. Because the planar faces that approximate the cylinder are oriented in 8° steps, the vertical edges are still visible. The edges that are obtained when setting $\delta_{min}$=15° ($A_{min}$=0.261) are shown in FIG. 11C. The edges of the cylinder are successfully suppressed. For most models $\delta_{min}$=15° works well. Therefore, $\delta_{min}$=15° is used as the default value in the implementation of this invention. The novel generation of 3-channel model images enables the use of existing 2D edge based matching approaches by simply passing a threshold for the edge amplitude to eliminate object edges that are not visible in a real image. This has not been applied in previous recognition approaches.

Figure 12:
FIG. 12 shows for each of the four pyramid levels the edges of two example 2D models.
Figure 12:
Figure 12:
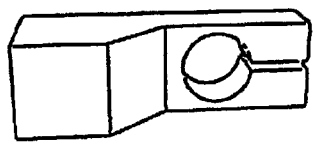
Figure 12:
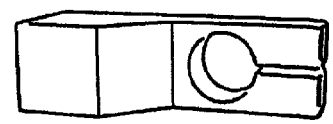
Figure 12:
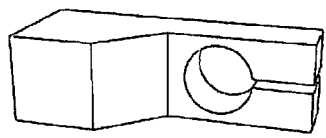
Figure 12:
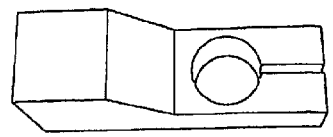
Figure 12:
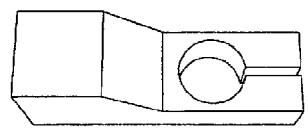
Figure 12:
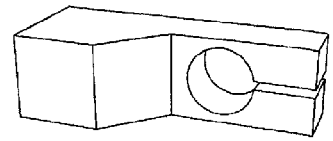

Finally, the 2D model is generated from the three-channel image on the associated image pyramid level (see EP 1,193, 642 and Di Zenzo, 1986 for details). In the last step, it is verified whether the created 2D model still shows enough distinct characteristics that are necessary to distinguish the model from clutter in the image (at 116). In the preferred embodiment of the invention this test is performed by comparing the edges that are obtained on the current pyramid level with the edges on the original level by using the approach proposed in (Ulrich, 2003). If the test fails the 2D model of this view and pyramid level is discarded. FIG. 12 shows for each pyramid level the edges of some example 2D models that are used for matching in the online-phase. For visualization purposes the 2D models on higher pyramid levels are scaled to the original resolution.

The 3D model consists of a plurality of 2D models on several pyramid levels. For each 2D model, the corresponding 3D pose is stored. Additionally, 2D models on neighboring pyramid levels are connected in form of a tree via the parent-child relationship described above.

Object Recognition

In the online-phase the created 3D model is used for recognizing the 3D object in a single camera image and for determining the 3D pose of the object with respect to the camera coordinate system. First, an image pyramid is built from the input image (at 203). The recognition starts at the highest pyramid level on which at least one valid 2D model is available (at 205). All 2D models on this pyramid level are searched by computing a similarity measure between the 2D models of the views and the current image pyramid level. For this, the 2D models are rotated and scaled in the necessary range and the similarity measure is computed at each position of the scaled and rotated 2D models in the image. The similarity measure described in EP 1,193,642 is applied. Because the 2D models were generated from artificial images, we do not know the polarity of the projected edges but only their direction. Therefore, from the similarity measures described in EP 1,193,642 the variant that ignores the local polarity of the gradients is selected. Alternatively, any other edge-based 2D-matching approach can be used in the invention instead, e.g., approaches that are based on the mean edge distance (Borgefors, 1988), approaches that are based on the Hausdorff Distance (Rucklidge, 1997), or approaches that are based on the generalized Hough transform (Ballard, 1981 or Ulrich et al., 2003). The 2D poses (position, rotation, scaling) of matches that exceed a certain similarity threshold are stored in the list of match candidates. On the next lower pyramid levels all 2D models that do not have a parent node in the tree are searched in the same way as the views on the highest pyramid level. Additionally, the match candidates that have been found on the previous pyramid level are refined. The refinement is performed by selecting all child views in the tree and computing the similarity measure between the 2D models of the child views and the current image pyramid level. However, it is sufficient to compute the similarity measure only in a very restricted parameter range according to the match of the parent view. This means that the range of investigated positions, rotations, and scalings can be limited to the close neighborhood of the parent match as described in EP 1,193,642. This process is repeated until all match candidates are tracked down to the lowest pyramid level (at 206). The combination of a pyramid approach with hierarchical model views that are arranged in a tree structure is essential for real-time applications and has not been applied in previous recognition approaches.

Figure 13A:
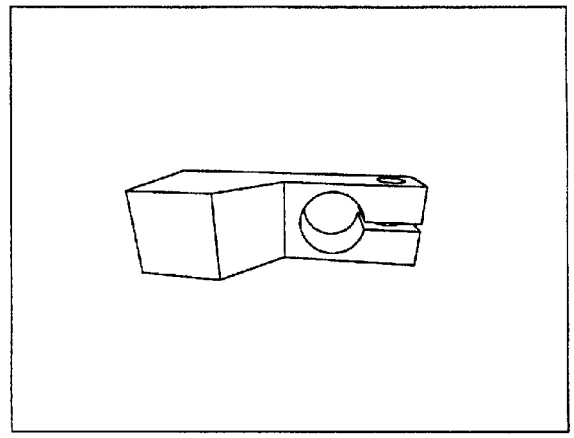
FIG. 13A shows an object view where the camera is directed to the center of the object.
Figure 13B:
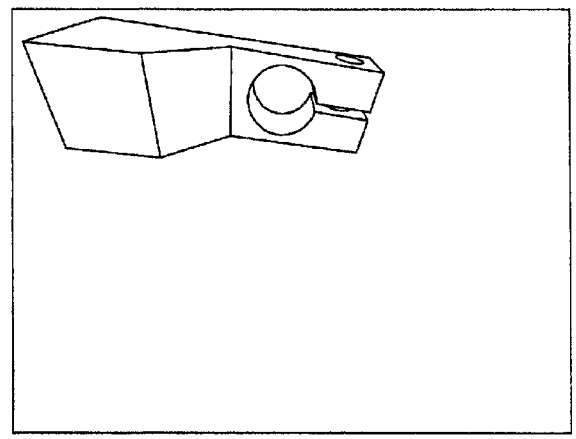
FIG. 13B shows an object view that is obtained when rotating the camera of FIG. 13A around its optical center down to the right.
Figure 13C:
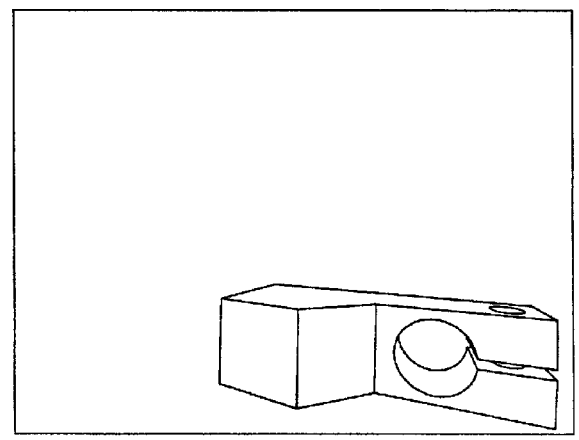
FIG. 13C shows an object view that is obtained when rotating the camera of FIG. 13A around its optical center up to the left.

Unfortunately, the tracking as described above will fail if the camera is not directed to the center of the object, and hence, the object does not appear in the image center. Because the 2D models that have been created during the training are created by assuming a camera that is directed to the object center, the 2D model and the projected model in the image are related by a 2D projective transformation. An example is shown in FIG. 13: FIG. 13A shows a view where the camera is directed to the center of the object. From this view a 2D model was created during the 3D model generation. During the search, the object might appear in arbitrary image positions, like it is shown in FIG. 13B or FIG. 13C. This apparent movement in the image plane in reality corresponds to a rotation of the camera around its optical center. When rotating the camera around its optical center, the resulting images are related by a projective transformation, also called a homography (see, for example, Hartley and Zisserman, 2000). Consequently, when searching the 2D model of FIG. 13A in the images of FIG. 13B or FIG. 13C, the model will not be found because the images are related by a homography while during the 2D matching only a similarity transformation is taken into account, i.e., a translation, a rotation, and a scaling. When taking the full 8 degrees of freedom of a homography during the matching into account the search would be much too slow for real-time applications. Therefore, in the preferred embodiment of the invention, the 2D model is transformed by a projective transformation before performing the matching. The parameters of this transformation can be computed if the position of the object in the image is known. Therefore, before a match candidate is tracked to the next lower pyramid level, the 2D models of its child views are projectively corrected according to the position of the match candidate (at 207). This is an absolutely essential step that has not been applied in previous view-based recognition approaches. Let x be the 2D model point generated by projecting the 3D model into the image plane of a camera that is directed to the model center like it is done during the generation of the 3D model. Furthermore, let K be the camera calibration matrix that holds the interior orientation of the camera:

$$K = \begin{pmatrix} af' & 0 & c_x \\ 0 & f' & c_y \\ 0 & 0 & 1 \end{pmatrix}$$

Here, f' is the focal length of the camera in pixels, α is the aspect ratio of the pixels, and $(c_x, c_y)$ is the principal point of the camera in pixels. Additionally, the orientation of the camera is described by the rotation matrix R. Then, the projection of a (inhomogeneous) 3D would point X to a (homogeneous) 2D image point x can be described by the transformation x=KRX. Without loss of generality, the rotation matrix R can be set to the identity matrix during model generation yielding x=KX. If the camera is rotated around its optical center by R, the same world point is mapped to a new point x'=KRX in the image of the rotated camera. From these results, the transformation can be computed that maps x to x':

$$x'=KRK^{-1}x=Hx$$

Here, $KRK^{-1}$ is a 3×3 homogenous transformation matrix, and hence represents a homography H.

Consequently, if we want to transform the 2D model points in accordance with the (homogeneous) position $p=(c, r, 1)^T$ of the projected model in the image, we have to know K and R. The calibration matrix K is obtained from the camera calibration process described above. The rotation matrix of the camera can be computed from the position of the projected model in the image in the following way: First, we have to introduce the constraint that the camera must not be rotated around its z axis in order to make the problem well-defined. Then, the remaining rotations around the camera's x and y axes can be derived from p. First, p is transformed into a direction P in 3D space by $P=(P_x, P_y, P_z)^T=K^{-1}p$. Then, the rotation angles α and β around the x and the y axis of the camera, respectively, can be computed by $$\alpha = \arctan\frac{P_y}{\sqrt{P_z^2 + P_x^2}},$$

$$\beta = \arctan\frac{P_x}{P_z}.$$

Thus, the rotation matrix R is obtained as $R=R_y(\beta)R_x(\alpha)$ with $$R_y(\beta) = \begin{pmatrix} \cos\beta & 0 & -\sin\beta \\ 0 & 1 & 0 \\ \sin\beta & 0 & \cos\beta \end{pmatrix},$$

$$R_x(\alpha) = \begin{pmatrix} 1 & 0 & 0 \\ 0 & \cos\alpha & \sin\alpha \\ 0 & -\sin\alpha & \cos\alpha \end{pmatrix}.$$

Now, the 2D models of the child views can be projectively corrected according to the image position of the match candidate during the tracking: The model points are transformed by using the homography H, while the gradient directions, which are used in the similarity measure in EP 1,193,642, are transformed by using the transposed inverse $H^{-T}$. The matching is performed with the projectively corrected models (at 208).

The described method works well during the tracking of matches in the pyramid where information about the position of the object in the image is available. In contrast, on the top pyramid level an exhaustive search must be performed because no previous knowledge is available. Thus, the matching is performed at all image positions. However, transforming the models in dependence on the current image position would be too expensive. Fortunately, on the highest level in general the projective distortions are very small because of the subsampling that comes with the image pyramid. Therefore, in most cases they can simply be ignored. In some cases, however, the distortions must be taken into account even on the top pyramid level, e.g., when only a few pyramid levels can be used or the depth of the object with respect to its distance to the camera is large. In the preferred embodiment of the invention, those cases can be handled by mapping the planar 2D model (at 117) as well as the image (at 202) to the surface of a sphere before applying the matching on the highest pyramid level. The advantage is that the projection does not change when rotating the camera around its optical center. Unfortunately, there is no mapping from the sphere into the plane without introducing distortions. However, in general these distortions are smaller in comparison to the projective distortions. Therefore, the spherical mapping can be used to reduce the magnitude of the distortions on the top pyramid level, and hence to increase the robustness of the matching. In one embodiment the spherical mapping is done by applying the following steps: First, again the pixel p is transformed into a direction P in 3D space by $P=(P_x, P_y, P_z)^T=K^{-1}p$. The spherical mapping is done by applying $$P'_x = \arctan\frac{P_x}{P_z},$$

$$P'_y = \arctan\frac{P_y}{P_z},$$

and $$P'_z = P_z.$$

Finally, the mapped 3D direction is transformed back to pixel coordinates: p'=KP'. In an alternative embodiment of the invention an isotropic spherical mapping is applied instead. First, the point in the image plane is transformed into polar coordinates:

$$\zeta = \arctan\frac{P_y}{P_x},$$

$$r = \sqrt{P_x^2 + P_y^2}$$

Then, the spherical mapping is applied only to the radius:

$$r' = \arctan\frac{r}{P_z}$$

And finally, the point is transformed back to Cartesian coordinates:

$$P_x'=r'\sin\zeta, P_y'=r'\cos\zeta, \text{ and } P_z'=P_z.$$

Alternatively, other similar mappings that are able to reduce the projective distortions can be applied instead of the two described methods without departing from the scope of the invention.

The spherical mapping is applied to the top level of the image pyramid of the search image as well as to the 2D model points. In order to speed up the spherical mapping of the search image, the mapping is computed offline during the generation of the 3D model (at 105). For each pixel of the mapped image the pixel coordinates of the original image as well as the weights for the bilinear interpolation are stored within the 3D model. This information is used in the online-phase to efficiently map the top level of the image pyramid. The position of each match that is found on the (spherical) top pyramid level is transformed back from the spherical projection to the original image using the respective inverse transformation. The tracking through the pyramid is performed in the original (non-spherical) image as described above.

As the result of the matching one obtains the 2D poses (position, rotation, scaling) of the 2D matches in the image that exceed a certain similarity measure. For each match the corresponding 3D object pose can be computed based on the 2D matching pose and the 3D pose of the model view that is associated with the match (at 209). Let the 3D pose of the model view be expressed as a homogenous 4×4 matrix $H_v$, which transforms points from the model reference coordinate system into the camera coordinate system. Furthermore, the 2D matching pose is given by $p=(r, c, 1)^T$ (position in row and column direction), $\gamma$ (rotation), and, s (scaling). Then the matrix $H_v$ must be modified such that it reflects the 2D matching pose. First, the 2D scaling is applied, which is interpreted as the inverse scaling of the distance between object and camera:

$$H_{V,s} = \begin{bmatrix} 1/s & 0 & 0 & 0 \\ 0 & 1/s & 0 & 0 \\ 0 & 0 & 1/s & 0 \\ 0 & 0 & 0 & 1 \end{bmatrix} H_V$$

Then, the 2D rotation is applied, which is interpreted as a 3D rotation of the camera around its z axis:

$$H_{V,s,\gamma} = \begin{bmatrix} \cos(-\gamma) & -\sin(-\gamma) & 0 & 0 \\ \sin(-\gamma) & \cos(-\gamma) & 0 & 0 \\ 0 & 0 & 1 & 0 \\ 0 & 0 & 0 & 1 \end{bmatrix} H_{V,s}$$

Finally, the position is interpreted as a 3D rotation of the camera around its x and y axis. The two rotation angles can be computed by transforming the position into a direction P in 3D space:

$$P=(P_x,P_y,P_z)^T=K^{-1}p$$

Then, the rotation angles $\alpha$ and $\beta$ around the x and y axis, respectively, are $$\alpha=\arctan(-P_y/\sqrt{P_x^2+P_z^2}), \beta=\arctan(P_x/P_z)$$

This results in the final homogeneous transformation matrix $H_{V,s,\gamma,p}$, which describes the 3D pose of the object with respect to the camera coordinate system:

$$H_{V,s,\gamma,p} = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} H_{V,s,\gamma}$$

The accuracy of the obtained 3D pose is limited to the sampling of the views and the sampling of the 2D poses during the 2D matching, i.e., position, rotation, scaling. For practical applications, this is not sufficient. Therefore, a pose refinement step is essential to allow practical applications (at 210). The 3D pose refinement is performed by using a least-squares adjustment. For this, the 3D object is projected into the search image by using the 3D pose $H_{V,s,\gamma,p}$ that is obtained from the matching (at 211). During the projection the hidden-line-algorithm is used to suppress lines that are not visible under the current pose. In addition, lines are suppressed that represent object edges at which the angle between the two adjacent object faces is below a given threshold. This threshold value has the same semantics as the minimum face angle from which the threshold value for the edge extraction in the 3-channel image in the offline-phase was derived, and hence is set to the same value. The visible projected model edges are sampled to discrete points using a suitable sampling distance, e.g., 1 pixel. For each sampled edge point a local search is initiated in order to find the corresponding subpixel-precise image edge point in the neighborhood of the sampled edge point (at 212). The search is restricted to a direction that is perpendicular to the projected model edge. Additionally, for each found potential correspondence, the angle difference between the perpendicular to the projected model edge and the image gradient is computed. Only the correspondences with an angle difference below a threshold are accepted as valid correspondences. Finally, the refined 3D pose is obtained by using a robust iterative non-linear optimization algorithm (at 213), e.g., Levenberg-Marquardt (see Press et al., 1992, for example). During the optimization the squared distances of the image edge points to their corresponding projected model edge are minimized directly over the 6 pose parameters (3 translation parameters and 3 rotation parameters). Additionally, the distances are weighted according to the angle difference during the optimization. The minimization process including the error function as well as the partial derivatives is described in detail in (Lanser, 1998). After the minimization, the refined pose parameters are available. Because from the refined pose parameters new correspondences can arise, the optimization algorithm is integrated within an outer iteration. Therefore, in one embodiment of the invention, the model is reprojected for the refined pose by using the hidden-line algorithm and the correspondences are recomputed after each iteration. Unfortunately, the hidden-line computation requires a significant amount of computation time, which in some cases is too slow for real-time computations, especially when using a complex 3D model that consist of many edges. Therefore, in the preferred embodiment of the invention the reprojection is done without applying the hidden-line algorithm in each iteration. Instead, the hidden-line algorithm is only applied in the first iteration. From the result of the hidden-line algorithm in the first iteration, the two end points of the visible part of each projected model edge are available in the image. Each end point together with the optical center defines a line of sight in 3D. The two lines of sight are intersected with the 3D model edge. The two intersections define the part of the 3D model edge that is visible under the initial pose. In further iteration, not the complete 3D model edge but only the part that was visible in the first iteration is projected. On the one hand, this speeds up the pose refinement dramatically because no hidden-line algorithm needs to be applied. On the other hand, in most cases the error that is introduced by this simplification only marginally degrades the obtained accuracy.

If the camera lens has significant distortions, they should be eliminated before applying the matching. This can easily be done by rectifying the search image (at 201), thus obtaining an image that is free from distortions. In order to speed up the rectification of the search image, a mapping is computed offline during the generation of the 3D model similar to the computation of the spherical mapping (at 106). First, the parameters of a new (fictitious) camera are computed that does not show radial distortions, i.e., $\kappa=0$. Then, for each pixel of the rectified image the pixel coordinates of the original image can be computed by using the parameters of the original and the fictitious camera. The pixel coordinates as well as the weights for the bilinear interpolation are stored within the 3D model. This information is used in the online-phase to efficiently map the search image before computing the image pyramid. During the 3D model generation the parameters of the fictitious camera are used instead of the parameters of the original camera. In a preferred embodiment of the invention both mappings (spherical mapping and rectification of the lens distortions) are combined into a single map, which reduces the computation time in the online-phase.

If the object shows a characteristic texture, the present invention can benefit from this additional information. In a preferred embodiment of the invention the user provides some example images of the object after generating the 3D model. In the first step, the 3D model is used to determine the 3D pose of the object in the example images. Then, each face of the 3D model is projected into the example image using the determined 3D pose. The texture information that is present in the example image under the projected model face is used to augment the model face with texture information by rectifying the part of the example image onto the 3D face based on the 3D pose of the face. This step is repeated for all faces and for all example images. If the same face is visible in more than one example image, the example image that is best suited for this face is selected. In the preferred embodiment of the invention the example image is selected in which the face shows the smallest projective distortion. In an alternative embodiment, the example image is selected in which the extracted edges within the face have the highest contrast. Finally, the 3D model is augmented by adding the texture information to the 2D models (at 115). Consequently, each view within the 3D model contains a 2D model that contains edges that result from geometry information (without polarity information) as well as edges that result from the texture information (with or without polarity information). In an alternative embodiment of the invention, the geometry information is completely omitted and the 2D model only contains texture information. The latter is for example useful if the 3D model edges do not produce 2D edges in the image because of the chosen illumination or because of the material of the object.

Figure 14A:
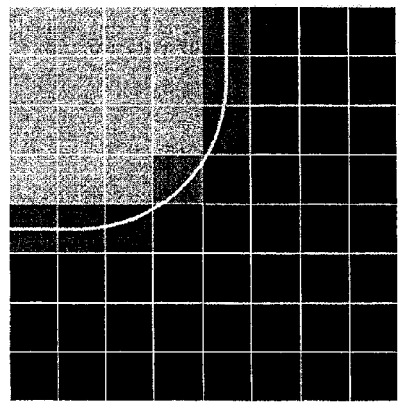
FIG. 14A is a visualization of a zoomed part of an artificial image that is obtained by painting the white subpixel precise curved contour into a black image.
Figure 14B:
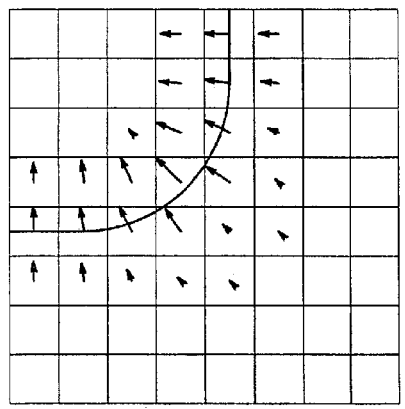
FIG. 14B is a visualization of the gradient vectors obtained after applying an edge filter.
Figure 14C:
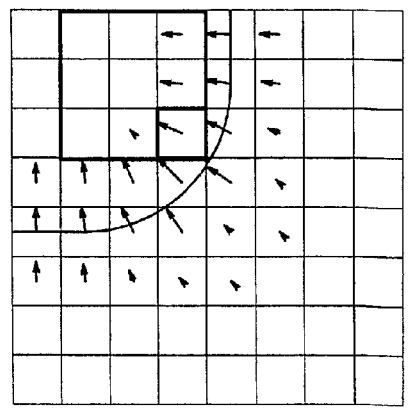
FIG. 14C is a visualization of a 3×3 filter mask that is applied to the gradient vectors and that selects the gradient vector with maximum amplitude, and hence can be used to expand the gradient information to the neighboring pixels.
Figure 14D:
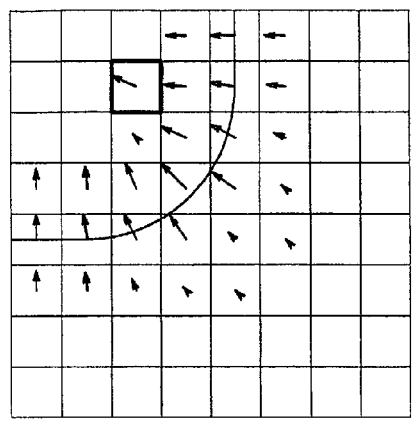
FIG. 14D is a visualization of the result that is obtained when applying the filter mask at the position visualized in FIG. 14C.
Figure 14E:
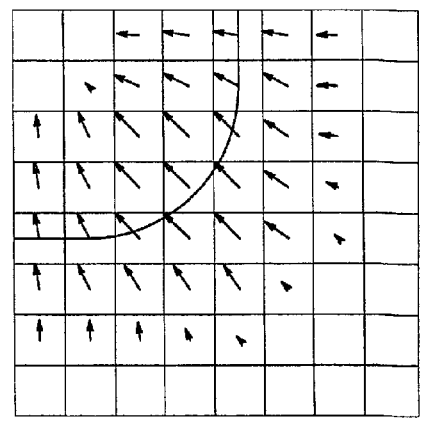
FIG. 14E is a visualization of the result that is obtained when applying the filter mask to the full image.

The speed of the recognition can be further increased by expanding the gradient direction information in the search image (at 204). The similarity measure in EP 1,193,642 compares the normalized gradients of the model with the normalized gradients in the search image. This is done by transforming the model edges and their gradient vectors according to the allowed transformation class (e.g., rigid transformation) and the gradient vector of each transformed model edge point is compared to the underlying gradient vector in the search image. In real images, this measure is robust to small displacements of the edge points of about 1 pixel in both directions of the gradient because the gradient direction in this neighborhood only slightly changes. Thus the tolerance of this similarity measure is about 1 pixel. The number of 2D models within the 3D model strongly depends on this tolerance value. The difference between two neighboring views can be interpreted as small displacements of the extracted model edges in the projection of the second view with respect to the first view. If the displacements are smaller than the tolerance value, both views can be merged to one view because they are equivalent in terms of the applied similarity measure. Consequently, if there would be a method with which the tolerance could be increased, the number of views, and hence the computation time in the online-phase could be reduced. Approaches that model such displacements by decomposing the object into several rigid components that are allowed to move with respect to each other (U.S. Pat. No. 7,239,929) cannot be used in this case because the number of necessary components would be too high resulting in long computation times. In the preferred embodiment of the invention a kind of maximum filter is applied to the gradients in the search image in order to expand the gradient direction information. The process is illustrated in FIG. 14. In FIG. 14A a zoomed part of an artificial example search image is shown that was created by painting the white subpixel precise curved contour into the image. The pixel grid is visualized by white horizontal and vertical lines. The gradient vectors of this image that are obtained after edge filtering are shown in FIG. 14B. The length of the vectors is proportional to the edge amplitude. In order to expand the gradient direction, a maximum filter of size 3×3 is moved across the image. At each position the gradient vector at the center of the filter is replaced by the gradient vector with the largest amplitude within the filter. For example, in FIG. 14C the position of the filter is indicated by a 3×3 bold square. The gradient with the largest amplitude is in the lower right corner under the filter mask. Consequently, the pixel at the center of the filter mask is assigned the gradient vector of the lower right corner (see FIG. 14D). The final result after applying the filter to the full image is shown in FIG. 14E. One can see that the edge directions are propagated by 1 pixel starting from the edge in both directions. Consequently, when using the expanded gradient image, the similarity measure is robust to small displacements of about 2 pixels. Higher tolerances can be achieved by applying larger filter masks or by consecutively applying a small filter mask several times. Unfortunately, the size of the filter mask can not be chosen arbitrarily large. Otherwise, errors in the neighborhood of curved edges or in the neighborhood of fine structures with several close edges are introduced which would result in a lower matching robustness. In the preferred embodiment of the invention, a 3×3 filter mask is used because it provides a good trade-off between speed and robustness.

The present invention provides a system and method for recognizing a 3D object in a single camera image and for determining the 3D pose of the object with respect to the camera coordinate system. The novel combination of a pyramid approach with hierarchical model views that are arranged in a tree structure is essential for real-time applications and has not been applied in previous recognition approaches. The novel generation of 3-channel model images enables the use of existing 2D edge based matching approaches by simply passing a threshold for the edge amplitude to eliminate object edges that are not visible in a real image. This has also not been applied in previous recognition approaches. The novel projective transformation of 2D models during the tracking is essential for a high robustness of the recognition approach. This has also not been applied in previous recognition approaches. Finally, a high accuracy is obtained by applying a subsequent 3D pose refinement. The initial 3D pose for the refinement is obtained by combining the 2D matching pose with the 3D pose of the corresponding view. Optional methods are provided that can be used to efficiently eliminate radial distortions. Furthermore, optional methods are provided that efficiently map the model and the image to a spherical projection to eliminate projective distortions on the highest pyramid level that in some cases otherwise would reduce the robustness of the 2D matching. The novel expansion of the gradient information that is used for matching is essential for a fast recognition because the number of necessary views that must be matched can be reduced.

Implementation in a Robot Vision System

Figure 15A:
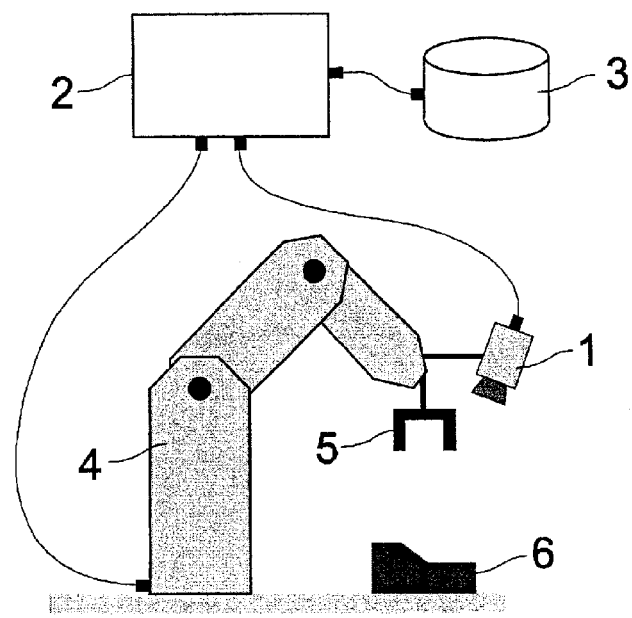
FIG. 15A is an illustration of an example of a basic robot vision system that incorporates the methods presented in this invention using a moving camera.
Figure 15B:
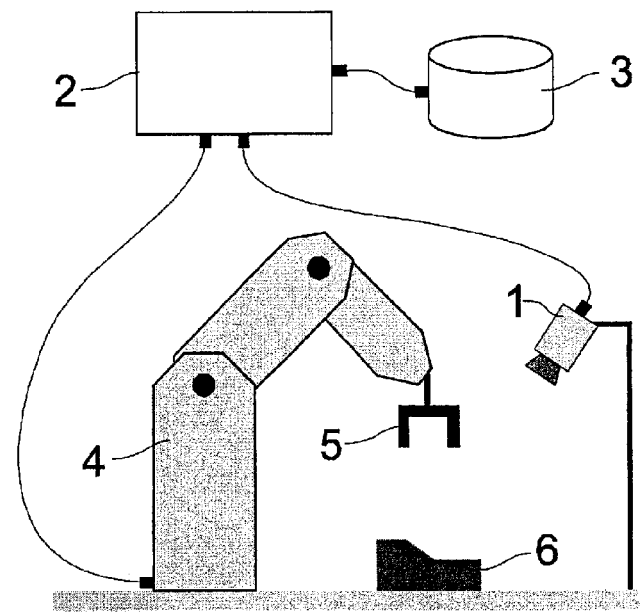
FIG. 15B is an illustration of an example of a basic robot vision system that incorporates the methods presented in this invention using a fixed camera.

In FIG. 15, an example of a basic robot vision system is illustrated, which incorporates the methods presented in this invention. A typical application area for 3D object recognition is robot vision. The system comprises an image acquisition device 1 for acquiring an image, an image processor for analyzing the image 2, a storage device containing the 3D model data 3, and a robot 4. The image processor can be provided as any suitable combination of hardware and software, such as, for example, a suitably programmed computer. The robot typically is equipped with a gripper or grasper 5 for handling objects. Such systems are also called "hand-eye systems" because the robotic "hand" is guided by mechanical "eyes". In order to use the result of the object recognition approach, the 3D pose of the object must be transformed into the coordinate system of the robot. Thus, besides calibrating the camera one must also calibrate the hand-eye system, i.e., determine the transformation between camera and robot coordinates. Then it is possible to create appropriate robot commands, e.g., to grasp the object 6. In general, there are two possible realizations of such a system. The first possibility is that the camera is connected to the robot, and hence moves if the robot moves (FIG. 15A). The second possibility is that the camera is fixed with respect to the world coordinate system (FIG. 15B). In both cases, the relative pose of the gripper with respect to the camera can be determined by using a standard method for "hand-eye calibration". Consequently, in practice the object recognition is performed as follows:

In the offline phase, the following steps are performed: A.1. Calibrate the interior orientation of the camera (if not simultaneously performed in step A.2); A.2. Perform the "hand-eye" calibration of the robot; A.3. Provide a 3D description of the 3D object to be found; A.4. Specify the parameter range in which the object should be found in the online phase; A.5. Generate a 3D model from the 3D object description within the specified pose range and store the 3D model on a storage device.

In the online phase, the following steps are performed: B1. Acquire an image of the object with the image acquisition device; B.2. Perform the 3D object recognition with the 3D model stored on the storage device to determine the 3D pose of the object with respect to the camera coordinate system. B.3. Concatenate the 3D pose of the object and the pose of the robot with respect to the camera to obtain the 3D pose of the object in the robot coordinate system. B.4. Create an appropriate robot command, e.g., to grasp the object.

While several particular embodiments of the invention have been described in detail, various modifications to the preferred embodiments can be made without departing from the spirit and scope of the invention. Accordingly, the above description is not intended to limit the invention except as indicated in the claims.

REFERENCES CITED

D. H. Ballard: Generalizing the Hough transform to detect arbitrary shapes. *Pattern Recognition*, 13(2):111-122, 1981.

M. W. Bern and D. Eppstein: Mesh generation and optimal triangulation, *Technical Report CSL*-92-1, Xerox Palo Alto Research Center, 1992.

J. R. Beveridge and E. M. Riseman: Optimal Geometric Model Matching under Full 3D Perspective, *Computer Vision and Image Understanding*, 61(3): 351-364, 1995.

G. Borgefors: Hierarchical chamfer matching: A parametric edge matching algorithm. *IEEE Transactions on Pattern Analysis and Machine Intelligence*, 10(6): 849-865, 1988.

L. G. Brown: A survey of image registration techniques. *ACM Computing Surveys*, 24(4): 325-376, December 1992.

P. David, D. DeMenthon, R. Duraiswami, H. Samet: Simultaneous Pose and Correspondence Determination using Line Features, *Conference on Computer Vision and Pattern Recognition* 2003, Vol. 2: 424-431, 2003.

S. Di Zenzo: A note on the gradient of a multi-image. *Computer Vision, Graphics, and Image Processing* 33: 116-125, 1986.

D. M. Gavrila, F. C. A. Groen: 3D object recognition from 2D images using geometric hashing, *Pattern Recognition Letters* 13: 263-278, 1992.

R. I. Hartley and A. Zisserman: Multiple View Geometry in Computer Vision, Cambridge University Press, Cambridge, 2000.

R. Horaud: New Methods for Matching 3-D Objects with Single Perspective Views, *IEEE Transactions on Pattern Analysis and Machine Intelligence*, 9(3): 401-412, 1987.

S. Lanser: Modellbasierte Lokalisation gestützt auf monokulare Videobilder, *Dissertation thesis, Technische Universität München, Fakultät für Informatik*, 1997.

S. Lanser, C. Zierl, and R. Beutlhauser: Multibildkalibrierung einer CCD-Kamera, in G. Sagerer, S. Posch and F. Kummert (editors), *Mustererkennung*, Informatik aktuell, Springer-Verlag, Berlin: 481-491, 1995.

V. Lepetit, J. Pilet, and P. Fua: Point Matching as a Classification Problem for Fast and Robust Object Pose Estimation, *Conference on Computer Vision and Pattern Recognition, Vol. 2*: 244-250, 2004.

O. Munkelt: Erkennung von Objekten in Einzelvideobildern mittels Aspektbäumen, *Dissertation thesis*, Technische Universitat München, Institut für Informatik, München, 1996.

M. S. Paterson and F. F. Yao: Efficient binary space partitions for hidden-surface removal and solid modeling. *Discrete & Computational Geometry*, 5(1): 485-503, 1990.

W. H. Press, S. A. Teukolsky, W. T. Vetterling, and B. P. Flannery: Numerical Recipes in C: The Art of Scientific Computing, 2nd edn, Cambridge University Press, Cambridge, 1992.

W. J. Rucklidge: Efficiently locating objects using the Hausdorff distance. *International Journal of Computer Vision*, 24(3): 251-270, 1997.

D. Rypl: Approaches to Discretization of 3D Surfaces, *Habilitation thesis, CTU Reports*, 7(2), CTU Publishing House, Prague, Czech Republic, ISBN 80-01-02755-4, 2003.

Y. Sumi and F. Tomita: Object Recognition Using Segment-Based Stereo Vision, Asian Conference on Computer Vision: 249-256, 1998.

S. L. Tanimoto: Template matching in pyramids, *Computer Graphics and Image Processing* 16: 356-369, 1981.

M. Ulrich, C. Steger, and A. Baumgartner: Real-time object recognition using a modified generalized Hough transform, *Pattern Recognition,* 36(11): 2557-2570, 2003.

M. Ulrich: Hierarchical Real-Time Recognition of Compound Objects in Images, *Dissertation thesis*, Technische Universität München, Fakultät Bauingenieur-und Vermessungswesen, Deutsche Geodätische Kommission bei der Bayerischen Akademie der Wissenschaften, Reihe C: Dissertationen, Heft Nr. 568, München, 2003.

The invention claimed is:

1. A method for transforming an object into an electronic 3-D model for 3D object recognition comprising the following steps: (a) providing the interior parameters of a camera using a computer processor; (b) providing a geometric representation of a 3D object; (c) providing a range of poses in which the 3D object may appear with respect to the camera by (c1) providing a range of positions by providing intervals for coordinate and (c2) providing a range of orientations by providing intervals for angles; (d) creating virtual views of the 3D object by sampling the range of poses for different image resolutions; (e) representing all views by a tree structure where views that correspond to the same image resolution reside at the same hierarchy level in the tree; and (f) for each view creating a 2D model that can be used to find the 2D view in an image by using an appropriate 2D matching approach.

2. The method of claim 1, where the interior parameters of the camera of step (a) are obtained by performing a geometric camera calibration.

3. The method of claim 1, wherein the geometric representation of step (b) is a 3D Computer Aided Design model.

4. The method of claim 3, wherein the 3D CAD model is represented by a DXF file.

5. The method of claim 1, wherein providing the range of poses of step (c) is providing the range of poses of the camera in a fixed object coordinate system comprising the steps of (c1) transforming the 3D object representation into a reference object coordinate system; (c2) providing a camera position by providing intervals for spherical coordinates longitude, latitude, and distance in the reference object coordinate system; (c3) rotating the camera such that a Z axis of the camera coordinate system passes through the origin of the reference object coordinate system and an X axis of the camera coordinate system is parallel to a predefined plane; and (c4) providing the camera orientation by providing an interval for a camera roll angle.

6. The method of claim 5, wherein in step (c3) the predefined plane is the equatorial plane of the reference object coordinate system.

7. The method of claim 1, wherein providing the range of poses of step (c) is providing the range of poses of the camera in the fixed object coordinate system comprising the steps of: (c1) transforming the 3D object representation into a reference object coordinate system; (c2) providing the camera position by providing intervals for X, Y, and Z coordinates in the reference object coordinate system; (c3) rotating the camera such that a Z axis of the camera coordinate system passes through the origin of the reference object coordinate system and an X axis of the camera coordinate system is parallel to a predefined plane; and (c4) providing the camera orientation by providing an interval for a camera roll angle.

8. The method of claim 7, wherein in step (c3) the predefined plane is the plane that is spanned by the X and Z axis of the reference object coordinate system.

9. The method of claim 5 or 7, wherein in step (c4) the camera roll angle is the rotation of the camera around its Z axis.

10. The method of claim 1, wherein providing the range of poses of step (c) is providing the range of poses of the object within a fixed camera coordinate system.

11. The method of claim 5 or 7, wherein the reference object coordinate system in step (c1) is identical to the object coordinate system that is defined by the geometric representation.

12. The method of claim 5 or 7, wherein the reference object coordinate system in step (c1) is the object coordinate system that is defined by the geometric representation translated to the center of the 3D object and rotated into a provided reference orientation.

13. The method of claim 1, wherein creating virtual views of the 3D object by sampling the range of poses for different image resolutions is creating virtual views of the 3D object by sampling the range of poses for different levels of an image pyramid.

14. The method of claim 1, wherein step (d) comprises the steps of: (d1) computing an over-sampling of the views on the highest image resolution, or on a lowest pyramid level; (d2) thinning out the views by successively merging neighboring views that have a similarity that exceeds a predefined threshold; (d3) repeating step (d2) until no more two neighboring views have a similarity that exceeds the threshold of step (d2); (d4) copying the merged views into the 3D model; and (d5) repeating steps (d2)-(d4) for all image resolutions after relaxing the similarity threshold of (d2).

15. The method of claim 14, wherein the similarity in step (d2) is computed by projecting the object into the image plane of both views and computing the similarity between both projections based on the similarity measure that is used in the 2D matching approach mentioned in step (f) of claim 1.

16. The method of claim 14, wherein the similarity in step (d2) is computed by only projecting a 3D bounding box of the object into the image plane of both views and computing the similarity between both projections based on the similarity measure that is used in the 2D matching approach mentioned in step (f) of claim 1.

17. The method of claim 15 or 16, wherein the similarity measure is replaced by an analytic approximation that can be computed faster than the original similarity measure.

18. The method of claim 14, wherein the steps (d2) and (d3) are iterated by starting with a fastest approximation of the similarity measure and refining the similarity measure until the original similarity measure is used.

19. The method of claim 14, wherein relaxing of the similarity threshold in step (d5) is performed by smoothing and sub-sampling the image to get a next higher pyramid level and computing the similarity measure on the sub-sampled images.

20. The method of claim 14, wherein relaxing of the similarity threshold in step (d5) is performed by multiplying a position tolerance during an analytic approximation of the similarity measure in accordance with the pyramid level.

21. The method of claim 1, wherein step (e) comprises the steps of: (e1) for each view storing the 3D pose of the view in the 3D model; (e2) for each view storing a reference to all child views in the 3D model; and (e3) for each view storing a reference to its parent view in the 3D model.

22. The method of claim 1, wherein step (f) comprises the steps of (f1) projecting the 3D object into the image plane of each view yielding 3-channel images, where the three channels represent the three elements of the normal vector of the faces of the 3D object; and (f2) creating 2D models consisting of the image edges, which are obtained by thresholding the gradient amplitudes of the 3-channel images.

23. The method of claim 22, wherein creating the 2D model in step (f2) comprises creating a 2D model that can be used for a matching approach that is based on the generalized Hough transform, on the Hausdorff distance, or on the dot product of the edge gradient directions.

24. The method of claim 22, where the threshold in step (f2) is computed from a provided minimum face angle.

25. The method of claim 22, where in step (f1) a constant value is added to each image channel to ensure that the silhouette of the projected object is not suppressed by the thresholding in step (f2).

26. The method of claim 22, wherein the image edges obtained by the thresholding in step (f2) are automatically validated and the 2D model is discarded if the validation fails.

27. The method of claim 1, wherein the following additional steps are included: (g) computing a spherical mapping of the image plane that reduces the effect of projective distortions and storing the spherical mapping in the 3D model; (h) mapping the 2D models that are created in step (f) using the spherical mapping and storing the spherically mapped 2D models in addition to the original 2D models in the 3D model.

28. The method of claim 1, wherein the following additional step is included: (i) computing a mapping of the image plane that eliminates the effect of lense distortions and storing the mapping in the 3D model.

29. A method for electronically recognizing a 3D object and for determining its 3D pose from one image of the object comprising the following steps: (a) providing a 3D model of the 3D object using a computer processor; (b) providing an electronic search image of the 3D object; (c) creating a representation of the electronic search image containing different resolutions of the electronic search image; (d) matching the 2D models that do not have a parent view in a hierarchical tree structure to a respective level of an image pyramid of the search image; (e) verifying and refining the 2D matches of a top pyramid level by tracking them down to a lowest pyramid level; (f) determining an initial 3D pose from the 2D matches matching pose and the respective 3D pose; and (g) refining the said initial 3D poses.

30. The method of claim 29, wherein step (e) comprises the following steps: (e1) projectively transforming the 2D models of a child views in accordance with the position of the match candidate; and (e2) matching the transformed 2D models of the child views in a restricted parameter space to the image of the respective level of the image pyramid.

31. The method of claim 29 or 30, wherein the matching in step (d) or step (e2), respectively, is based on a generalized Hough transform, on a Hausdorff distance, or on a dot product of an edge gradient direction.

32. The method of claim 29 or 30, wherein the matching in step (d) or step (e2), respectively, is based on a dot product of an edge gradient direction ignoring the local polarity of the gradients.

33. The method of claim 29, wherein in step (d) the respective pyramid level on which the matching is performed is mapped by using the spherical mapping that is stored in the 3D model to reduce projective distortions before applying the matching and wherein in step (d) the spherically mapped 2D models are used for the matching instead of the original 2D models.

34. The method of claim 29 or 30, wherein in step (d) or step (e2), respectively, the respective pyramid level on which the matching is performed is mapped by using the mapping that is stored in the 3D model to eliminate lens distortions before applying the matching.

35. The method of claim 29, wherein the refining of the initial 3D object poses in step (g) is performed by minimizing the distance between subpixel precise image edge points and a corresponding projected 3D object edge.

36. The method of claim 35 comprising the following steps: (g1) projecting 3D model edges into the search image by using the initial 3D object pose while suppressing hidden object edges by using a hidden-line-algorithm and while suppressing object edges at which the angle between the two adjacent faces is below a provided minimum face angle; (g2) sampling projected edges to discrete points in accordance with the pixel grid (g3) finding for each sampled edge point the corresponding subpixel-precise image edge point in the neighborhood of the sampled edge point; and (g4) determining the 6 parameters of the refined 3D object pose by minimizing the sum of squared distances between point correspondences by using an iterative non-linear optimization algorithm.

37. The method of claim 36, wherein in step (g3) finding the corresponding subpixel-precise image edge point is restricted to a direction that is perpendicular to the projected model edge.

38. The method of claim 36, wherein in step (g3) only correspondences with an angle difference below a threshold are accepted as valid correspondences, where the angle difference is computed between the perpendicular to the projected model edge and the image gradient.

39. The method of claim 36, wherein in step (g4) the squared distances are weighted according to the angle difference during the optimization, where the angle difference is computed between the perpendicular to the projected model edge and the image gradient.

40. The method of claim 36, wherein the steps (g1) to (g4) are iterated until the refined 3D object pose does not change significantly between the last two iterations.

41. The method of claim 36, wherein the steps (g1) to (g4) are iterated for a provided fixed number of iterations.

42. The method of claim 40 or 41, wherein in step (g1) the hidden-line-algorithm is only applied in the first iteration, whereas in higher iterations only the parts of the 3D model edges that have been visible in the first iteration are projected without performing the hidden-line-algorithm anew.

43. The method of claim 29 or 30, wherein a gradient direction in the image is expanded before performing the matching by applying a maximum filter to the gradients where at each filter position the gradient vector at the center of the filter is replaced by the gradient vector with the largest amplitude within the filter.

44. A method for augmenting a 3D model with texture information: (a) providing two or more example images of the 3D object using a computer processor; (b) determining the 3D pose of the 3D object in each of the example images by using the steps that are described in claim 31; (c) for each example image projecting each face of the 3D model into the example image using the 3D pose determined in step (b); (d) for each object face rectifying the part in the example image that is covered by the projected face using the 3D pose of the face; and (e) augmenting the 2D models with the derived texture information of the rectified textured object faces, resulting in 2D models containing both geometric information as well as texture information.

45. The method of claim 44, wherein step (e) is replaced by the following step: (e) regenerating the 2D models by using only the derived texture information of the rectified textured object faces and omitting the geometry information.

* * * * *